(12) United States Patent  (10) Patent No.: US 9,071,710 B2
Motosugi et al.  (45) Date of Patent: Jun. 30, 2015

(54) IMAGE FORMING APPARATUS, PRINTING SYSTEM AND FUNCTION SETTING METHOD THEREOF

(75) Inventors: Toshihisa Motosugi, Okazaki (JP); Yasuyuki Kamai, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 342 days.

(21) Appl. No.: 13/163,436

(22) Filed: Jun. 17, 2011

(65) Prior Publication Data

US 2011/0310423 A1  Dec. 22, 2011

(30) Foreign Application Priority Data

Jun. 22, 2010 (JP) ................................. 2010-141232
Oct. 28, 2010 (JP) ................................. 2010-241870
Dec. 22, 2010 (JP) ................................. 2010-286371

(51) Int. Cl.
*G06K 15/02* (2006.01)
*H04N 1/00* (2006.01)

(52) U.S. Cl.
CPC ........ *H04N 1/00355* (2013.01); *H04N 1/00334* (2013.01); *H04N 1/00363* (2013.01); *H04N 1/00368* (2013.01); *H04N 1/00392* (2013.01); *H04N 1/00411* (2013.01); *H04N 1/00432* (2013.01); *H04N 1/00482* (2013.01); *H04N 1/00514* (2013.01); *H04N 1/00968* (2013.01); *H04N 2201/0094* (2013.01)

(58) Field of Classification Search
USPC ................................................. 358/1.18, 1.13
See application file for complete search history.

(56) References Cited

U.S. PATENT DOCUMENTS 5,263,129 A    11/1993  Ikegaya et al.
2007/0177196 A1*  8/2007  Maeda ......................... 358/1.15
2008/0239333 A1* 10/2008  Ogashiwa ...................... 358/1.4
(Continued)

FOREIGN PATENT DOCUMENTS

CN     101299780      11/2008
JP     3-218160        9/1991
(Continued)

OTHER PUBLICATIONS

Notice of Reasons for Refusal dated Sep. 9, 2013 for Japanese Patent Application No. JP 2010-141232 (2 pages).
(Continued)

*Primary Examiner* — King Poon
*Assistant Examiner* — Andrew H Lam
(74) *Attorney, Agent, or Firm* — Holtz, Holtz, Goodman & Chick PC

(57) ABSTRACT

An image forming apparatus having a display section to display screens for setting a function; a control section to form an image where alternatives of a function to be set by transiting plural screens are aggregated and arranged on one page of sheet, and to form a composite image where a position detection code for identifying a position on the sheet is combined with the image; a memory section to store a table which correlates each of the alternatives with a position of each of the alternatives on the sheet; and a print section to print the composite image on the sheet, wherein in cases where the control section acquires position information having been identified by the position detection code on the sheet, the control section refers to the table to identify an alternative corresponding to the position information, and sets a function based on the identified alternative.

8 Claims, 17 Drawing Sheets

(56) References Cited

U.S. PATENT DOCUMENTS

2009/0164894 A1* 6/2009 Takekawa et al. ............ 715/274
2010/0050128 A1   2/2010 Chiang et al.

FOREIGN PATENT DOCUMENTS

| JP | 2003-529852 | 10/2003 |
| JP | 2004-280519 | 10/2004 |
| JP | 2008-242723 | 10/2008 |
| WO | WO 01/75779 | 10/2001 |

OTHER PUBLICATIONS

The First Office Action for Chinese Application No. 201110169111.1, dated Jul. 15, 2013 in the State Intellectual Property Office of People's Republic of China (6 pgs).

* cited by examiner

FIG. 6a

40: FUNCTION SELECTION SCREEN

| PLEASE SELECT REQUIRED FUNCTIONS, AND PRESS START KEY |
|---|
| TOP [COLOR] [PAPER] [MAGNIFICATION] [ORIGINAL→COPY] [PAGE AGGREGATION] |
| FINISHING [SHEET/GROUP] [STAPLE] [PUNCH] |
| ORIGINAL SETTING [ORIGINAL BINDING MARGIN] [ORIGINAL SET DIRECTION] |
| IMAGE QUALITY [ORIGINAL IMAGE QUALITY] [DENSITY] [LIGHTNESS] [CONTRAST] |
| APPLICATION [PAPER BINDING MARGIN] [BOOKLET] [IMAGE REPEAT] [OHP INTERLEAF] [COVER SHEET] [INTER SHEET] [DATE/TIME PRINT] [PAGE PRINT] [STAMP] |

⇩ SELECTION OF DESIRED FUNCTION

FIG. 6b

| PLEASE SELECT REQUIRED FUNCTIONS, AND PRESS START KEY |
|---|
| TOP [COLOR] [PAPER] [MAGNIFICATION] [ORIGINAL→COPY] [PAGE AGGREGATION] |
| FINISHING [SHEET/GROUP] [STAPLE] [PUNCH] |
| ORIGINAL SETTING [ORIGINAL BINDING MARGIN] [ORIGINAL SET DIRECTION] |
| IMAGE QUALITY [ORIGINAL IMAGE QUALITY] [DENSITY] [LIGHTNESS] [CONTRAST] |
| APPLICATION [PAPER BINDING MARGIN] [BOOKLET] [IMAGE REPEAT] [OHP INTERLEAF] [COVER SHEET] [INTER SHEET] [DATE/TIME PRINT] [PAGE PRINT] [STAMP] |

START KEY PRESSING.
ARRANGING SELECTED FUNCTIONS AND SYNTHESIZING A PATTERN.
⇩ CORRELATING ALTERNATIVE FOR PRINT AND POSITION INFORMATION, AND STORING IN NONVOLATILE MEMORY.

FIG. 6c

41: FUNCTION SETTING PRINT MATERIAL

| FUNCTION SETTING PRINT ... SETTABLE BY ELECTRONIC PEN |
|---|
| COLOR: [AUTO COLOR] [FULL COLOR] [BLACK] |
| ORIGINAL→COPY: [SINGLE SIDE→SINGLE SIDE] [SINGLE SIDE→DOUBLE SIDE] [DOUBLE SIDE→SINGLE SIDE] [DOUBLE SIDE→DOUBLE SIDE] |
| SORT/GROUP: [NON-SORT] [SORT] [GROUP] |
| ORIGINAL IMAGE QUALITY: [CHARACTER/PHOTO] [CHARACTER] [PHOTO] [MAP] |

FIG. 8

| MFP/FUNCTION | ALTERNATIVE | X Min. | X Max. | Y Min. | Y Max. |
|---|---|---|---|---|---|
| MFP | MFP-01 | $X_{01\text{-}1}$ | $X_{01\text{-}2}$ | $Y_{01\text{-}1}$ | $Y_{01\text{-}2}$ |
|  | MFP-02 | $X_{02\text{-}1}$ | $X_{02\text{-}2}$ | $Y_{02\text{-}1}$ | $Y_{02\text{-}2}$ |
|  | MFP-03 | $X_{03\text{-}1}$ | $X_{03\text{-}2}$ | $Y_{03\text{-}1}$ | $Y_{03\text{-}2}$ |
| COLOR | AUTO COLOR | $X_{A1\text{-}1}$ | $X_{A1\text{-}2}$ | $Y_{A1\text{-}1}$ | $Y_{A1\text{-}2}$ |
|  | FULL COLOR | $X_{A2\text{-}1}$ | $X_{A2\text{-}2}$ | $Y_{A2\text{-}1}$ | $Y_{A2\text{-}2}$ |
|  | BLACK | $X_{A3\text{-}1}$ | $X_{A3\text{-}2}$ | $Y_{A3\text{-}1}$ | $Y_{A3\text{-}2}$ |
| ORIGINAL→COPY | SINGLE SIDE→SINGLE SIDE | $X_{B1\text{-}1}$ | $X_{B1\text{-}2}$ | $Y_{B1\text{-}1}$ | $Y_{B1\text{-}2}$ |
|  | SINGLE SIDE→DOUBLE SIDE | $X_{B2\text{-}1}$ | $X_{B2\text{-}2}$ | $Y_{B2\text{-}1}$ | $Y_{B2\text{-}2}$ |
|  | DOUBLE SIDE→SINGLE SIDE | $X_{B3\text{-}1}$ | $X_{B3\text{-}2}$ | $Y_{B3\text{-}1}$ | $Y_{B3\text{-}2}$ |
|  | DOUBLE SIDE→DOUBLE SIDE | $X_{B4\text{-}1}$ | $X_{B4\text{-}2}$ | $Y_{B4\text{-}1}$ | $Y_{B4\text{-}2}$ |
| SORT/GROUP | NON-SORT | $X_{C1\text{-}1}$ | $X_{C1\text{-}2}$ | $Y_{C1\text{-}1}$ | $Y_{C1\text{-}2}$ |
|  | SORT | $X_{C2\text{-}1}$ | $X_{C2\text{-}2}$ | $Y_{C2\text{-}1}$ | $Y_{C2\text{-}2}$ |
|  | GROUP | $X_{C3\text{-}1}$ | $X_{C3\text{-}2}$ | $Y_{C3\text{-}1}$ | $Y_{C3\text{-}2}$ |
| ORIGINAL IMAGE QUALITY | CHARACTER/PHOTO | $X_{D1\text{-}1}$ | $X_{D1\text{-}2}$ | $Y_{D1\text{-}1}$ | $Y_{D1\text{-}2}$ |
|  | CHARACTER | $X_{D2\text{-}1}$ | $X_{D2\text{-}2}$ | $Y_{D2\text{-}1}$ | $Y_{D2\text{-}2}$ |
|  | PHOTO | $X_{D3\text{-}1}$ | $X_{D3\text{-}2}$ | $Y_{D3\text{-}1}$ | $Y_{D3\text{-}2}$ |
|  | MAP | $X_{D4\text{-}1}$ | $X_{D4\text{-}2}$ | $Y_{D4\text{-}1}$ | $Y_{D4\text{-}2}$ |

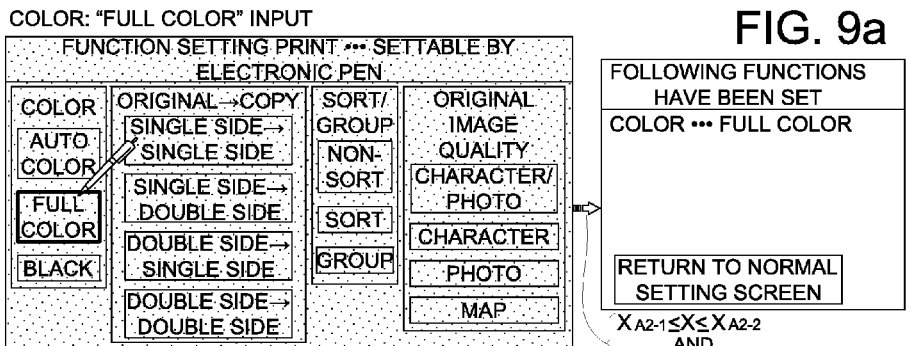
FIG. 9a
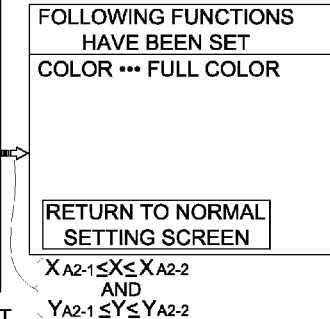
FIG. 9b
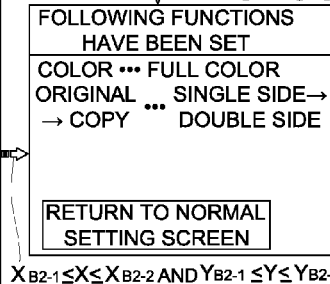
FIG. 9c
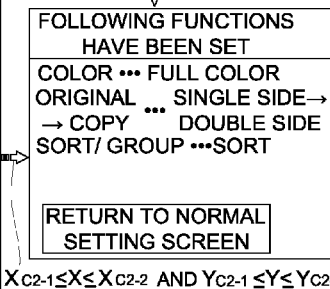
FIG. 9d
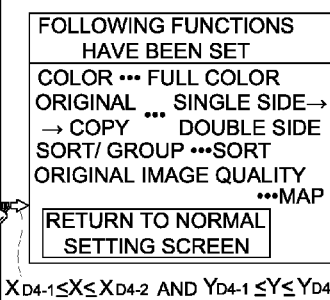

FIG. 12

| USER ID | SHEET ID | PATTERN ID |
|---|---|---|
| 0001 | 0001 | 0001 |
| 0002 | 0002 | 0002 |
| 0003 | 0003 | 0003 |
| 0004 | 0004 | 0004 |
| 0005 | 0005 | 0005 |
| 0006 | 0006 | 0006 |

FIG. 13

| USER ID | NAME | DEPARTMENT ID |
|---|---|---|
| 0001 | SUZUKI | 0001 |
| 0002 | YAMADA | 0001 |
| 0003 | WATANABE | 0001 |
| 0004 | ISHII | 0002 |
| 0005 | FUJII | 0002 |
| 0006 | TANAKA | 0002 |

FIG. 14

| SHEET ID | ACCESS TYPE | DEFAULT |
|---|---|---|
| 0001 | PUBLIC | TURE |
| 0002 | PUBLIC | FALSE |
| 0003 | PRIVATE | FALSE |
| 0004 | PUBLIC | FALSE |
| 0005 | PRIVATE | FALSE |
| 0006 | PUBLIC | FALSE |

FIG. 15

| SHEET ID | FUNCTION | ALTERNATIVE | X Min. | X Max. | Y Min. | Y Max. |
|---|---|---|---|---|---|---|
| 001 | COLOR | AUTO COLOR | $X_{A1\text{-}1}$ | $X_{A1\text{-}2}$ | $Y_{A1\text{-}1}$ | $Y_{A1\text{-}2}$ |
| | | FULL COLOR | $X_{A2\text{-}1}$ | $X_{A2\text{-}2}$ | $Y_{A2\text{-}1}$ | $Y_{A2\text{-}2}$ |
| | | BLACK | $X_{A3\text{-}1}$ | $X_{A3\text{-}2}$ | $Y_{A3\text{-}1}$ | $Y_{A3\text{-}2}$ |
| | ORIGINAL→COPY | SINGLE SIDE → SINGLE SIDE | $X_{B1\text{-}1}$ | $X_{B1\text{-}2}$ | $Y_{B1\text{-}1}$ | $Y_{B1\text{-}2}$ |
| | | SINGLE SIDE → DOUBLE SIDE | $X_{B2\text{-}1}$ | $X_{B2\text{-}2}$ | $Y_{B2\text{-}1}$ | $Y_{B2\text{-}2}$ |
| | | DOUBLE SIDE → SINGLE SIDE | $X_{B3\text{-}1}$ | $X_{B3\text{-}2}$ | $Y_{B3\text{-}1}$ | $Y_{B3\text{-}2}$ |
| | | DOUBLE SIDE → DOUBLE SIDE | $X_{B4\text{-}1}$ | $X_{B4\text{-}2}$ | $Y_{B4\text{-}1}$ | $Y_{B4\text{-}2}$ |
| | SORT/GROUP | NON-SORT | $X_{C1\text{-}1}$ | $X_{C1\text{-}2}$ | $Y_{C1\text{-}1}$ | $Y_{C1\text{-}2}$ |
| | | SORT | $X_{C2\text{-}1}$ | $X_{C2\text{-}2}$ | $Y_{C2\text{-}1}$ | $Y_{C2\text{-}2}$ |
| | | GROUP | $X_{C3\text{-}1}$ | $X_{C3\text{-}2}$ | $Y_{C3\text{-}1}$ | $Y_{C3\text{-}2}$ |
| | ORIGINAL IMAGE QUALITY | CHARACTER/PHOTO | $X_{D1\text{-}1}$ | $X_{D1\text{-}2}$ | $Y_{D1\text{-}1}$ | $Y_{D1\text{-}2}$ |
| | | CHARACTER | $X_{D2\text{-}1}$ | $X_{D2\text{-}2}$ | $Y_{D2\text{-}1}$ | $Y_{D2\text{-}2}$ |
| | | PHOTO | $X_{D3\text{-}1}$ | $X_{D3\text{-}2}$ | $Y_{D3\text{-}1}$ | $Y_{D3\text{-}2}$ |
| | | MAP | $X_{D4\text{-}1}$ | $X_{D4\text{-}2}$ | $Y_{D4\text{-}1}$ | $Y_{D4\text{-}2}$ |

| SHEET ID | FUNCTION | ALTERNATIVE | X Min. | X Max. | Y Min. | Y Max. |
|---|---|---|---|---|---|---|
| 002 | COLOR | AUTO COLOR | $X_{A1\text{-}1}$ | $X_{A1\text{-}2}$ | $Y_{A1\text{-}1}$ | $Y_{A1\text{-}2}$ |
| | | FULL COLOR | $X_{A2\text{-}1}$ | $X_{A2\text{-}2}$ | $Y_{A2\text{-}1}$ | $Y_{A2\text{-}2}$ |
| | | BLACK | $X_{A3\text{-}1}$ | $X_{A3\text{-}2}$ | $Y_{A3\text{-}1}$ | $Y_{A3\text{-}2}$ |
| | ORIGINAL→COPY | SINGLE SIDE → SINGLE SIDE | $X_{B1\text{-}1}$ | $X_{B1\text{-}2}$ | $Y_{B1\text{-}1}$ | $Y_{B1\text{-}2}$ |
| | | SINGLE SIDE → DOUBLE SIDE | $X_{B2\text{-}1}$ | $X_{B2\text{-}2}$ | $Y_{B2\text{-}1}$ | $Y_{B2\text{-}2}$ |
| | | DOUBLE SIDE → SINGLE SIDE | $X_{B3\text{-}1}$ | $X_{B3\text{-}2}$ | $Y_{B3\text{-}1}$ | $Y_{B3\text{-}2}$ |
| | | DOUBLE SIDE → DOUBLE SIDE | $X_{B4\text{-}1}$ | $X_{B4\text{-}2}$ | $Y_{B4\text{-}1}$ | $Y_{B4\text{-}2}$ |

IMAGE FORMING APPARATUS, PRINTING SYSTEM AND FUNCTION SETTING METHOD THEREOF

CROSS REFERENCE TO RELATED APPLICATIONS

This application is based on Japanese Patent Application No. 2010-141232, No. 2010-241870 and No. 2010-286371 respectively filed on Jun. 22, 2010, Oct. 28, 2010 and Dec. 22, 2010 with Japanese Patent Office, the entire content of which is hereby incorporated by reference.

BACKGROUND OF THE INVENTION

1. Technical Field

The present invention relates to an image forming apparatus, a printing system and a function setting method of the printing system.

2. Description of Prior Art

Recently, a Multi Function Peripheral (MFP) provided with a printer function and a scanner function has been widely used. And accompanied by multiplication of functions, operations are becoming complicated to set various kinds of functions. To solve this problem, there is an idea of using a large display screen to enable concurrent display of a lot of information, however, due to installation space and parts cost, using the large screen is not easy. Further, there is another idea to improve operability by devising the structure of the screen or a hierarchical structure. However, since a frequently used function differs according to a user or installation circumstances, it is difficult to make easy setting operations for all the functions. If each function is configured to be set across a plurality of hierarchical structures, the operations becomes large in scale and complicated.

Based on the above background, a new method to improve the operability of an MFP is required. For example, disclosed in Unexamined Japanese Patent Application Publication No. 2004-280519 (Patent Document 1) is a printer system which includes: a printing apparatus provided with a position information recording medium which records different information on front and back surfaces; a reading device to readout the position information recorded on the position information recording medium; a control program which transfers the position information, obtained from the recording medium recorded with the position information by the reading device, toward an application program; and an application program which is capable of communication with the control program to transfer the position information from the position information recording medium, and installed with a recording medium position determining function to measure the inclination angle of the recording medium from the obtained position information, and a print position adjusting function to correct the print position to be the same inclination angle with the inclined recording medium with respect to print information before sending to the printing apparatus, wherein the application program allows the print information adjusted with print position to be printed as it is.

Further disclosed in Patent Document 1 is a function allocation executing method in which by dividing the position information recording medium into arbitrary areas, allocating specific functions (such as an OCR, applications, and handwriting comparison, encryption, calculation and data base association) to the position corresponding to each of the arbitrary divided areas, a printer forms a stylized sheet based on the allocation; and by writing data on the stylized sheet of position information recording medium, transmitting the position information in the arbitrary divided area to an operating computer by use of a position information acquiring device (digital pen), executes the function allocated to each area based on the position information.

According to the above Patent Document 1, areas are divided on a sheet, in which position detection patterns are previously embedded, and a specific function is allocated to a divided area data and position information written in the area are obtained with an electronic pen; and the function allocated to the data in the area is executed based on the obtained position information. In this method, in cases of setting the function by transiting plural screens, selections of the function by use of plural sheets are required, which causes problems of poor operability.

Further according to the conventional method, since previously determined functions are allocated on the sheet, there may be cases where a user cannot select the desired function to be executed, and due to a lot of functions being printed on the sheet, the desired function may be difficult to identify.

The present invention is accomplished in view of the above problems, and the main objective is to provide an image forming apparatus and a function setting method of the image forming apparatus with which functions can be easily set even for functions which require transition of plural screens, in case of setting.

Further, the technology of Patent Document 1 enables to form a stylized sheet for executing a specific function previously allocated to each divided area however, since MFP is provided with many functions and functions required by users are various, the stylized sheet is not convenient. Thus, the prior technology enables users to operate a panel and select desired functions from the various functions, and form a sheet (to be referred as function setting printed material) allocated with the selected functions.

However, in cases where after a user forms and prints his/her own function setting printed material, prints the same material again, prints by editing the material, or forms and prints his/her own function setting printed material by reference of the material formed by another user, the user needs to select the functions for allocating on the sheet by use of a panel or the like, which prevents easy formation of the function setting printed material. Specifically, in cases where function selection screen 40 has a hierarchical structure and the function needs to be selected by transiting plural screens, it takes long time for selecting the function.

The present invention is accomplished in view of the above problem, and another objective is to provide an image forming apparatus and a function setting method which enable to a desired function setting printed material by utilizing a previously formed function setting printed material.

Further, according to the conventional method, since only the apparatus can be controlled that has printed the sheet allocated with functions, in order to control the other apparatus, said apparatus needs to print the sheet by itself, which is inconvenient for users.

The present invention is accomplished in view of the above problem, and still another objective is to provide a printing system and a function setting method, which enable to easily set functions required of transiting plural screen, and similarly enable to set functions by any of several apparatuses connected to a network.

SUMMARY

In order to solve at least one of the above described problems, an image forming apparatus reflecting one aspect of the present invention includes:

a display section to display screens for setting a function;

a control section to form an image where alternatives of a function to be set by transiting plural screens are aggregated and arranged on one page of sheet, and to form a composite image where a position detection code for identifying a position on the sheet is combined with the image;

a memory section to store a table which correlates each of the alternatives with a position of each of the alternatives on the sheet; and a print section to print the composite image on the sheet, wherein in cases where the control section acquires position information having been identified by the position detection code on the sheet, the control section refers to the table to identify an alternative corresponding to the position information, and sets a function based on the identified alternative.

An image forming apparatus reflecting another aspect of the present invention, being capable of communicating with an electronic pen, including:

a print section to form a function setting printed material which allocates areas for setting functions of the image forming apparatus on a sheet printed with position detection codes for detecting a position of pen tip of the electronic pen;

a memory section to memorize layout information correlating each function and position information of the each function on the sheet with an ID of a user who has instructed to form the function setting printed material; and a control section, in cases where a user logs-in by inputting a user ID, to identify the layout information memorized by correlating with the ID of the user having logged-in, and to display the identified layout information on the display section in selectable manner, wherein the control section controls the print section to form a new function setting printed material based on the layout information selected by the user who logged-in.

A printing system reflecting another aspect of the present invention is configured with a plurality of image forming apparatuses and a management server connected with the plurality of image forming apparatuses via a network to manage the plurality of image forming apparatuses, wherein each of the image forming apparatuses includes:

a display section to display screens for setting functions;

a control section to execute a process of forming an image in which alternatives of a function to be set by transiting a plurality of the screens, and alternatives to specify an image forming apparatus under management of the network are aggregated and arranged in one page of sheet, and forming a composite image by combining a position detection code to identify a position on the sheet with the image; a process of forming a table to correlate each of the alternatives with a position of each of the alternatives on the sheet, and transmitting the table to the management server; a process, in cases where the control section acquires position information identified by the position detection code on the sheet, of transmitting the position information to the management server; and a process of setting a function based on an instruction from the management server, and a print section to print the composite image on the sheet, and the management server includes:

a memory section to store the table; and a control section to execute, in cases where the control section acquires the position information from the image forming apparatus, a process of identifying an alternative corresponding to the position information, and a process of instructing to set a function specified by the identified alternatives, to an image forming apparatus specified by the identified alternatives.

BRIEF DESCRIPTION OF THE DRAWINGS

These and other objects, advantages and features of the invention will become apparent from the following description thereof taken in conjunction with the accompanying drawings in which:

FIGS. 6a-6c are diagrams showing procedures to output a function setting printed material relating to one embodiment of the present invention;

FIG. 8 is an example of a table correlating a function, alternative, and position information of an image area of the alternative;

FIGS. 9a-9d are a diagrams showing a function setting operation by use of the function setting printed material, relating to one embodiment of the present invention;

FIG. 12 is an example of table correlating user IDs and sheet IDs of function setting printed materials;

FIG. 13 is an example of table correlating user IDs and access ranges;

FIG. 14 is an example of table correlating sheet IDs of function setting printed materials user IDs and access types;

FIG. 15 is an example of table correlating sheet IDs of function setting printed materials user IDs and layout information;

DETAILED DESCRIPTION OF THE PREFERRED EMBODIMENTS

[First Embodiment]

As described in the description of prior art, accompanied by multiplication of functions in MFP, operations for setting functions are becoming complicated, and having been proposed a method for making a function executable by use of a sheet divided into areas for each function. However, according to this method, in cases of setting the function by transiting multiple screens, selection of function by use of multiple sheets are required, further since previously determined functions are printed on the sheet, there may be cases where a user cannot select the function desired to be executed, and due to a lot of functions being printed on the sheet, the desired function may be difficult to find.

And so, in one embodiment of the present invention, when a user selects a function on a screen, by forming an image where alternatives, that is adjustments corresponding to the selected function are aggregated and arranged in one page of sheet, correlating coordinates with the alternatives of the selected function and printing on the sheet, and in cases where the coordinates of the alternative (i.e. adjustment) selected by the user is obtained from the sheet, the function is set by identifying the alternative correlated to the coordinates. In this way, by enabling, on one sheet, the setting of the function required of setting across multiple pages, the operability at the time of :function setting can be remarkably improved.

Figure 1:
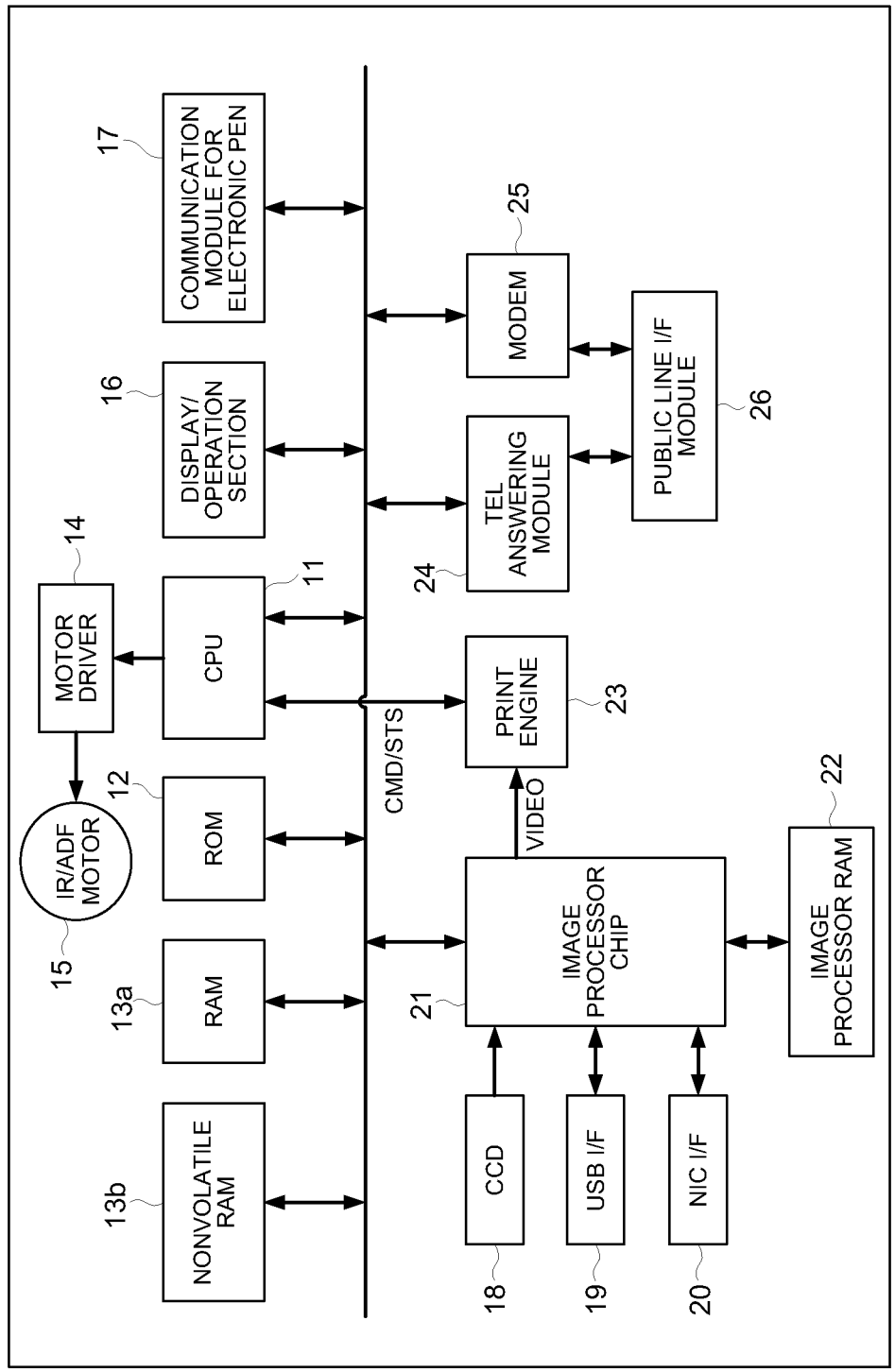
FIG. 1 is a block diagram showing a controller configuration of an image forming apparatus relating to one embodiment of the present invention.
Figure 2:
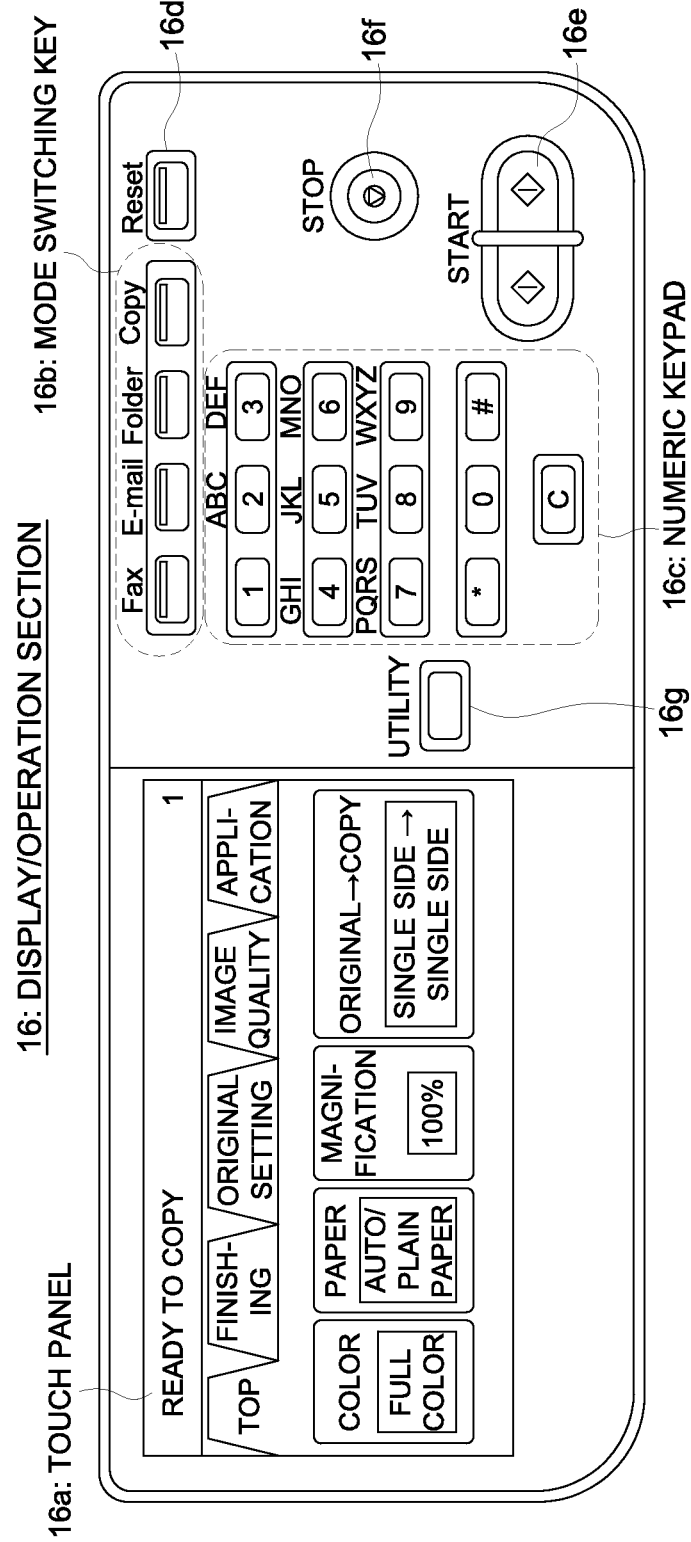
FIG. 2 is a diagram showing an external view configuration of a display/operation section of the image forming apparatus relating to one embodiment of the present invention.
Figure 3:
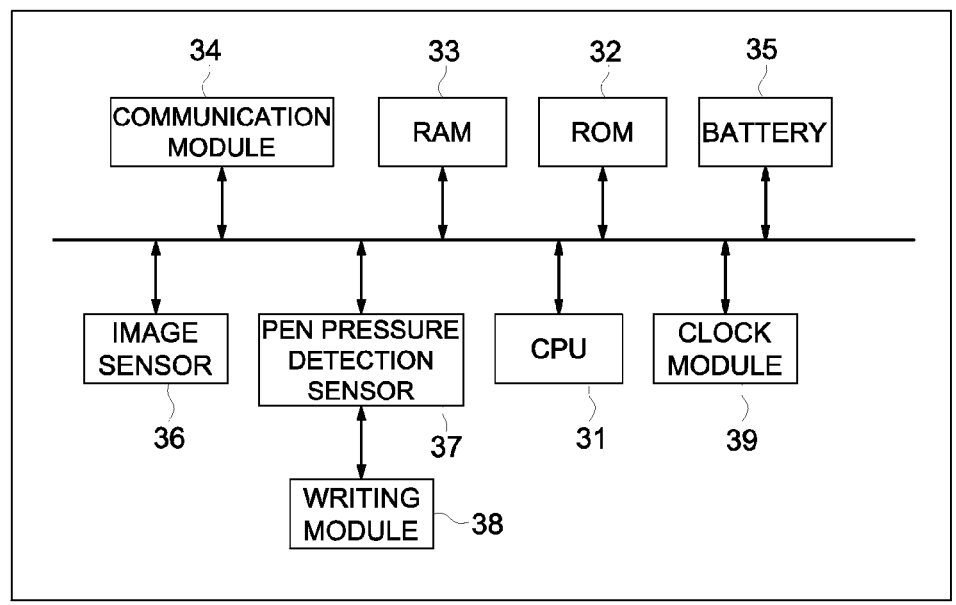
FIG. 3 is a block diagram showing a configuration of an electronic pen relating to one embodiment of the present invention.
Figure 4:
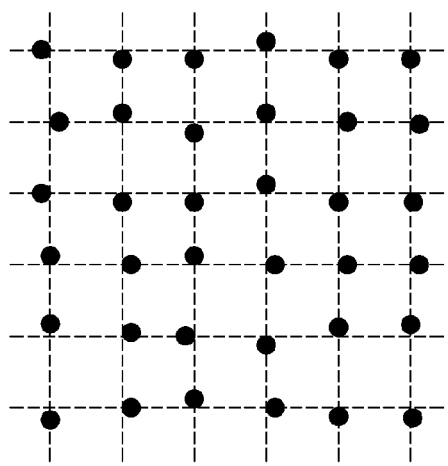
FIG. 4 is a diagram showing an example of an ANOTO™ pattern.
Figure 7:
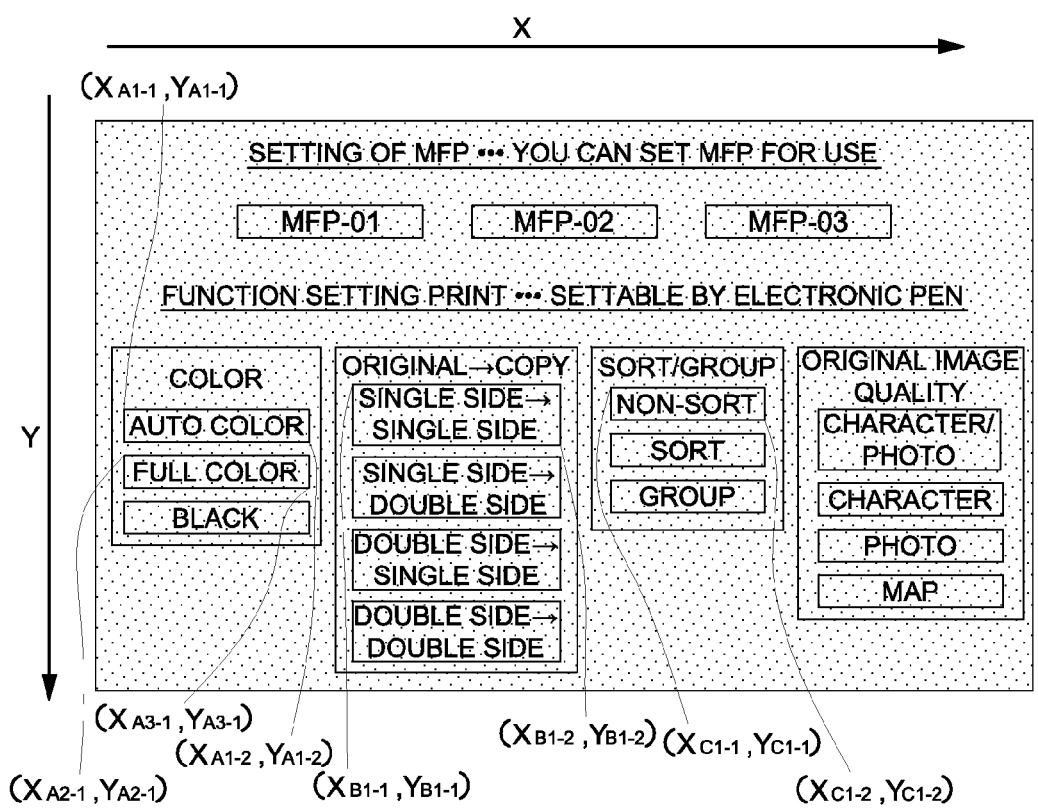
FIG. 7 is a diagram showing position information of each alternative in the function setting printed material, relating to one embodiment of the present invention.
Figure 10A:
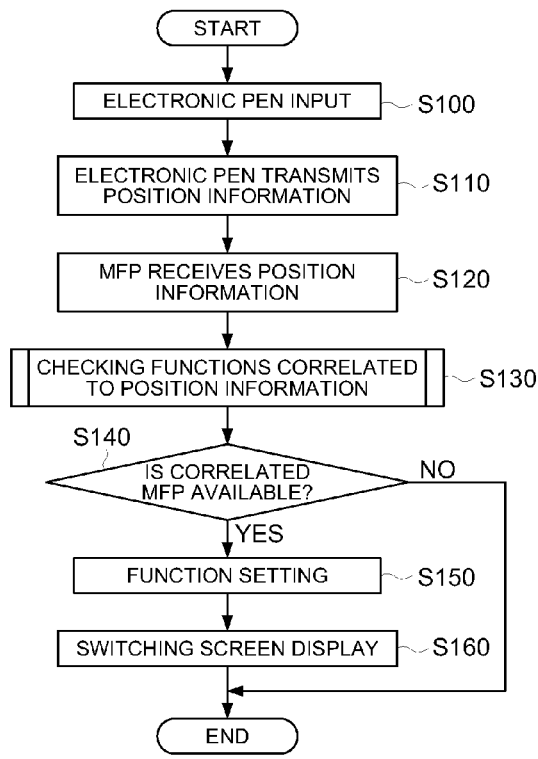
FIGS. 10a and 10b are flow charts showing the operation of the image forming apparatus relating to one embodiment of the present invention.
Figure 10B:
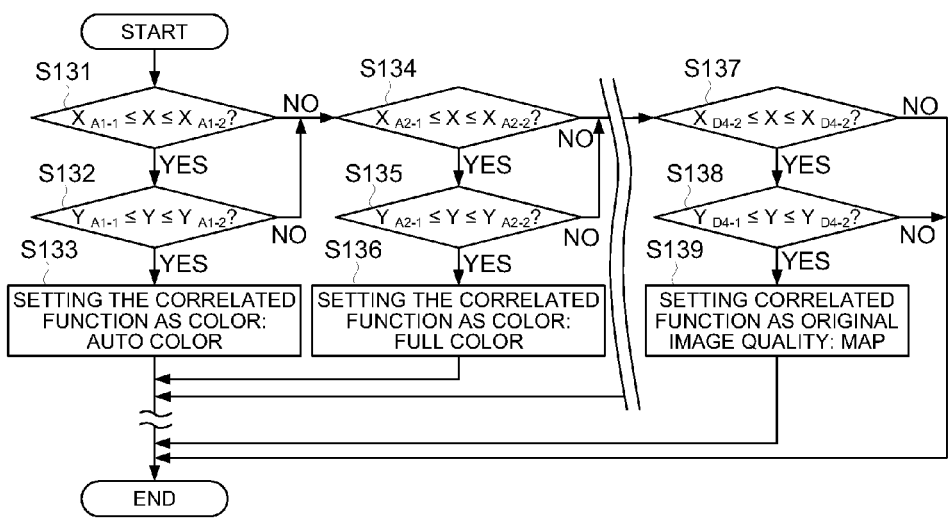

For explaining the above described embodiment of the present invention further in detail, the image forming apparatus and function setting method relating to an embodiment of the present invention will be described by referring to FIGS. 1-10. FIG. 1 is a block diagram showing a controller configuration of an image forming apparatus relating to one embodiment of the present invention; FIG. 2 is a diagram showing external view configuration of display/operation section; FIG. 3 is a block diagram showing a configuration of an electronic pen; FIG. 4 is a diagram showing an example of ANOTO™ pattern; FIGS. 5a-5d are examples of the screen displayed on the display/operation section of the embodiment of the image forming apparatus in the present embodiment; FIGS. 6a-6c are diagrams showing procedures to output a function setting printed material; FIG. 7 is a diagram showing position information of each image area in the printed material for function setting; FIG. 8 is an example of a table correlating a function, alternative, and position information of an image area of the alternative; FIGS. 9a-9d are diagrams showing a function setting operation using the function setting printed material; and FIGS. 10a-10b are flow charts showing the operations of the image forming apparatus relating to the present embodiment.

A system of the present embodiment is configured with an image forming apparatus such as an MFP, and an electronic pen which specifies and transmits a position on a sheet printed by the image fanning apparatus. In the present specification "function" is defined to include a scanner function, a facsimile function, a print function, a copy function and the like (in large classification), and functions being settable for each of the functions (for example a color copy function in the copy function, in small classification). Detailed explanation is described below referring to the drawings.

[Image Forming Apparatus]

FIG. 1 is a block diagram showing a controller of the image forming apparatus of the present embodiment, in which the controller is configured with CPU (Central Processing Unit) 11, ROM (Read Only Memory) 12, RAM (Random Access Memory) 13a, nonvolatile RAM 13b, motor driver 14, IR (Image Reader)/ADF (Auto Document Feeder) motor 15, display/operation section 16, electronic pen communication module 17, CCD (Charge Coupled Device) 18, USB (Universe Serial Bus) interface 19, NIC (Network Interface Card) 20, image processing chip 21, image processor RAM 22, print engine 23, TEL answering module 24, modem 25, public line interface module 26, and the like.

The control section is configured with CPU 11, ROM 12, RAM 13a, and nonvolatile RAM 13b. After copying a control program stored in ROM 12 onto RAM 13a, CPU 11 executes the total control with respect to each function such as a scanner function, a facsimile function, a print function, and a copy function based on the control program on RAM 13a. In the present embodiment, CPU 11 specifically executes the process of aggregating and arranging one or multiple functions selected by a user on a function selecting screen (to be described later), and a process of specifying the alternative corresponding to position information (coordinates) on a sheet (function setting printed material to be described later), and setting the function. In addition to the above control program, ROM 12 stores pattern data (for example, position detection code such as an ANOTO™ pattern). RAM 13a is used for a temporary storage site of image data to be displayed on display/operation section 16, in addition to the control program. Further, in cases where these data are necessary to be stored even after power off of image forming apparatus 10, the data is stored in nonvolatile RAM 13b.

IR/ADF motor 15 is the motor to drive the reading device and ADF. Motor driver 14 controls the drive of IR/ADF motor 15.

Display/operation section 16 is configured with a pressure sensitive touch panel in which transparent electrodes are latticed arranged on LCD (Liquid Crystal Display) or EL (electroluminescence). FIG. 2 shows a specific example of a display/operation section, in which touch panel 16a, mode switching key 16b and ten-key pad 16c enable the function setting. Reset key 16e returns the setting to initial setting values. Further, start key 16e starts operations such as copying, printing and transmission, and stop key 16f stops the operation state. Utility key 16g, executes system settings and adjusting functions of main body image forming apparatus 10.

Communication module for electronic pen 17 communicates with communication module 34 of electronic pen 30 via short distance wireless communication typified by BLUETOOTH™ communication system or wired communication, receives the position information on the sheet from electronic pen 30, and keeps it in RAM 13a.

CCD 18, installed on the reading device or ADF of image forming apparatus 10, detects reflection light by scanning the original document, and applies photoelectric conversion and further analogue-digital conversion to generate image data. USB interface 19 is an interface for connecting to USB compatible apparatuses. NIC 20 is an expansion card for connecting via LAN (Local Area Network) to the user's computer apparatus and the like, executes input of print data sent from user's computer apparatus, and transmits the image data generated based on the image signals obtained by scanning, to the user's computer apparatus and the like.

Image processor chip 21 executes image processing such as a magnification change, an image rotation, a density adjustment, an edge enhancement, a smoothing, and a binarization. Specifically in the present embodiment, the image processor executes processing to combine a pattern for electronic pen 30 to detect a position on a sheet, with the image, in which alternatives of a function, selected by a user via a later described function selecting screen, are aggregated and arranged on one page of sheet. Image processor RAM 22 temporarily stores image data and various calculation values outputted from image processor chip 21 in the course of image processing. Print engine 23 forms an image on a sheet based on the image data stored in image processor RAM 22.

TEL answering module 24 executes answering at the time of incoming. Modem 25 modulates digital signals into analogue signals for telephone line, and inversely converts it to demodulate. Public line interface module 26 is an interface to connect with a public circuit network.

General operations of the above configured controller will be outlined below. In case of receiving instruction from display/operation section 16, CPU 11 controls motor driver 14 to drive IR/ADF motor 15, and sends an image processing request to image processor chip 21.

Upon receiving the image processing request from CPU 11, image processor chip 21 receives scan data from CCD 18 and executes the image processing to convert it into the image indicated via display/operation section 16. At that time, data such as various calculation values are temporarily stored in image processor RAM 22.

After being temporarily stored in RAM 13a, the processed data outputted from image processor chip 21 is transferred to USB interface 19 or NIC 20 via image processor chip 21, in cases where the indication from display/operation section 16 is scanning. In cases where the indication from display/operation section 16 is a facsimile, the processed data is transferred to public line interface module 26 via modem 25. In cases where the indication from display/operation section 16 is copying, the processed data is transferred to print engine 23 via image processor chip 21.

In cases where print data is sent from an external, the print data is received via USB interface 19 or NIC 20, and after being expanded at image processor chip 21, temporarily stored in RAM 13a, and transferred to print engine 23.

Although FIG. 1 shows a configuration where image processor chip 21 executes the processing to aggregate and arrange the alternatives of each function onto one page, and to combine a pattern on the image, another configuration is applicable where a series of processing for forming an image by aggregating and arranging the alternatives of each function selected by a user via function selection screen onto one page, synthesizing a pattern onto the image, and allowing print engine 23 to print based on the combined image.

[Electronic Pen]

FIG. 3 is a block diagram showing a configuration of electronic pen 30, which is configured with CPU 31, ROM 32, RAM 33, communication module 34, battery module 35, image sensor 36, pen pressure detection sensor 37, writing module 38, clock module 39, and the like.

CPU 31 is a data processing device that executes computing based on programs. ROM 32 is an information storage section to store programs. RAM 33 is an information storage section to store data Communication module 34 communicates with communication module for electronic pen 17 in image forming apparatus 10, via a short distance wireless communication being typified by BLUETOOTH™ communication system or wired communication. Battery module 35 is a primary battery or a secondary battery as an electronic power source of electronic pen 30. Image sensor 36 is a small CCD or CMOS (Complementary Metal Oxide Semiconductor) video camera for reading out the pattern. Pen pressure detection sensor 37 is such as a piezoelectric element to detect writing pressures of electronic pen 30. Writing module 38 identifies a position of electronic pen 30 on a sheet based on the pattern read by image sensor 30, and outputs position information by using communication module 34. Clock module 39 is a unit to keep time information.

Electronic pen 30 works as long as provided with functions to specify the position on the printed material for function setting, and to transmit the position information (coordinates) to image forming apparatus 10, and its structure, shape, or communication means is not specifically restricted. For example, electronic pen 30 may be configured to identify a position by discriminating the ANOTO pattern, or by discriminating the structure, concentration, optical density, and the like of a pattern. Further, electronic pen 30 may be configured to identify the position by reading a pattern of bar code and the like, or may be configured to identify the position by coordinating with a device installed adjacent to the function setting printed material (for example, based on the angle and distance toward said device). In the present embodiment, the case of using the ANOTO pattern will be described.

FIG. 4 shows an example of the ANOTO™ pattern. The ANOTO™ pattern is a dot pattern arranged in lattice shape, where each dot is slightly shifted right or left, or up or down from orthogonal lines of 0.3 mm intervals in the lattice. And, dots in the pattern are read out with a matrix unit of 36 dots (6 horizontal dots by 6 vertical dots). In the ANOTO™ pattern, since every point has a unique value, if an arrangement of function setting printed material and ANOTO pattern to be combined into the function setting printed material is predetermined (in other words, if the ANOTO™ pattern clipped from what position in ANOTO™ space is combined is previously determined), electronic pen 30 can recognize any of the position on the function setting printed material. In the present embodiment, data of the ANOTO™ is previously stored in ROM 12, however, the data may be stored in a server on a network and may be used every time by obtaining it via the network.

Figure 5A:
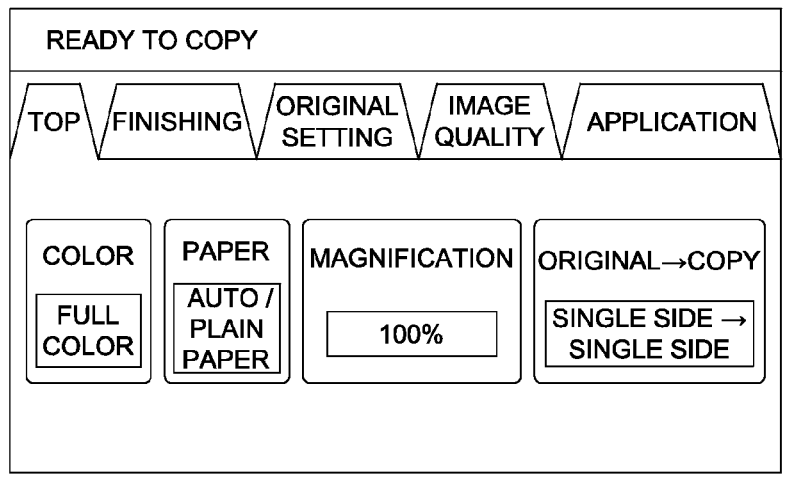
FIG. 5a is an example of a screen displayed on the display/operation section of the image forming apparatus.
Figure 5B:
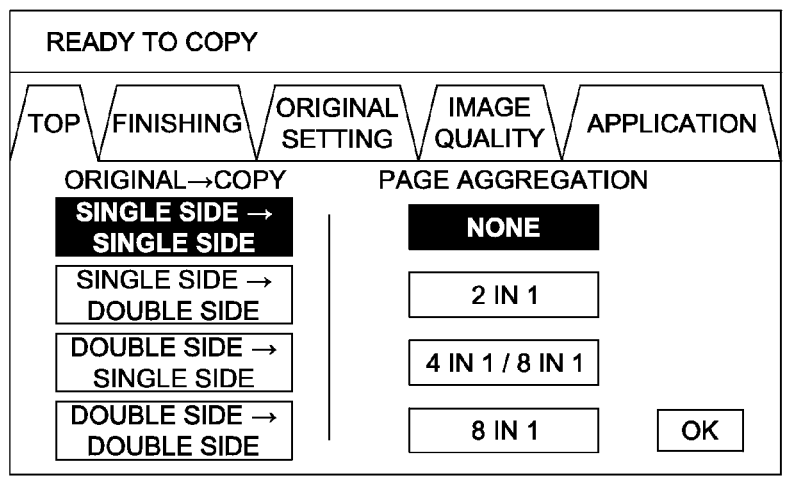
FIG. 5b another example of a screen displayed on the display/operation section of the image forming apparatus.
Figure 5C:
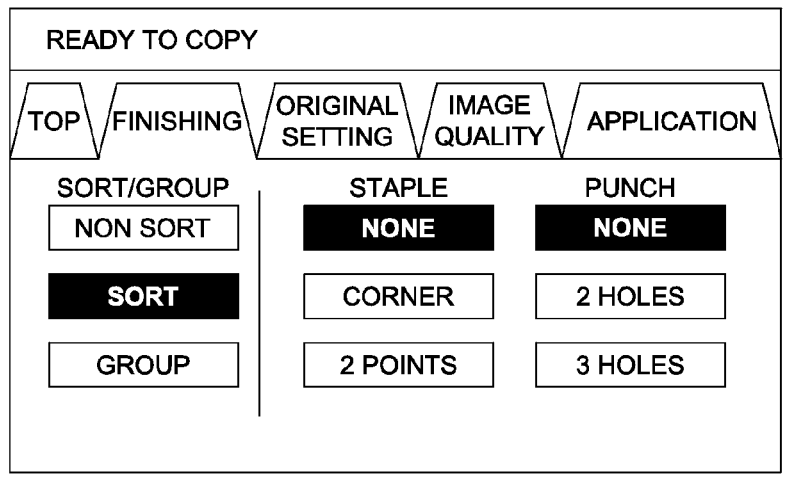
FIG. 5c another example of a screen displayed on the display/operation section of the image forming apparatus.
Figure 5D:
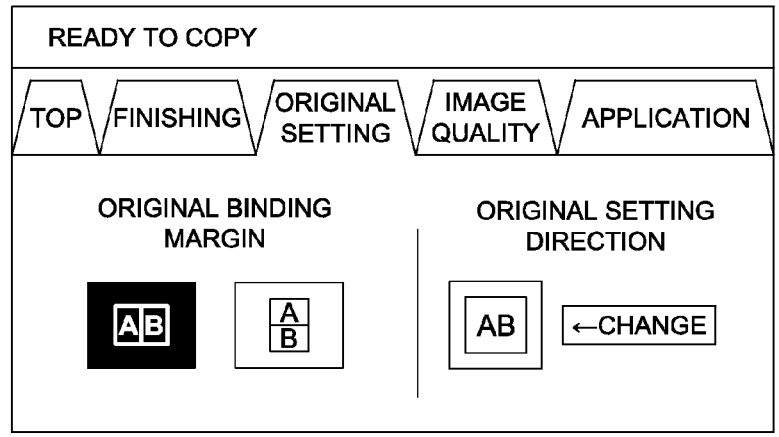
FIG. 5d another example of a screen displayed on the display/operation section of the image forming apparatus.
Figure 5E:
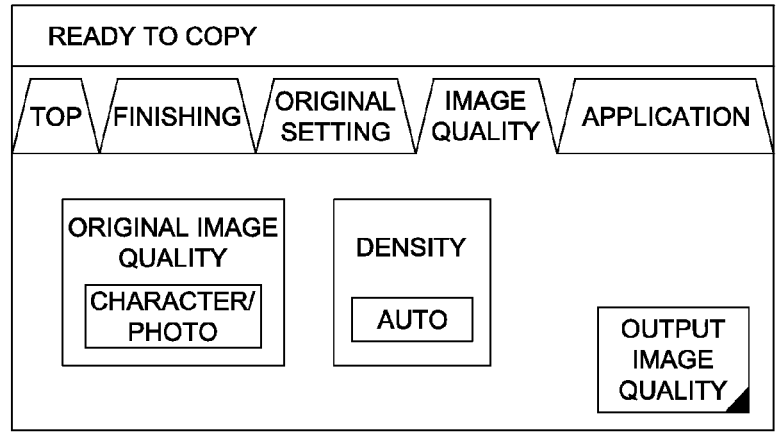
FIG. 5e another example of a screen displayed on the display/operation section of the image forming apparatus.
Figure 5F:
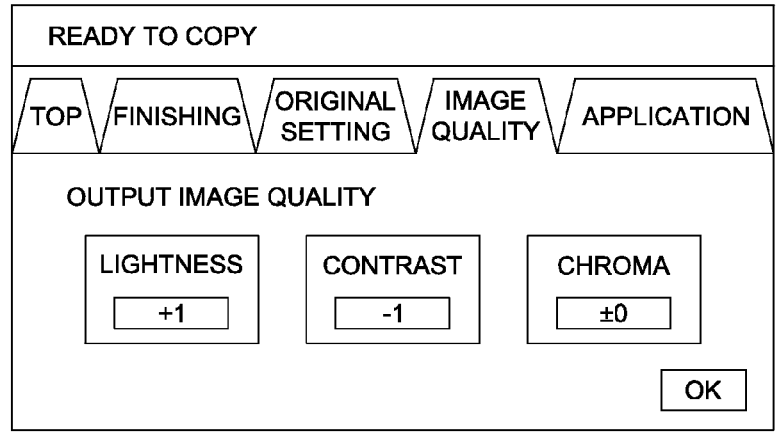
FIG. 5f another example of a screen displayed on the display/operation section of the image forming apparatus.
Figure 5G:
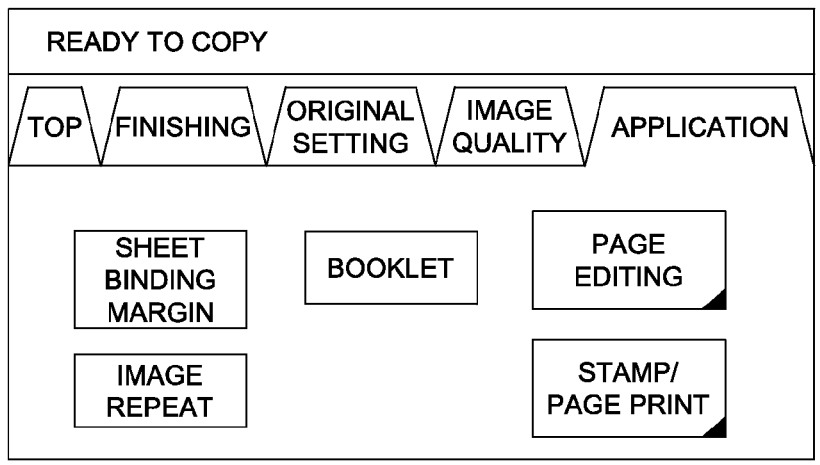
FIG. 5g another example of a screen displayed on the display/operation section of the image forming apparatus.

FIGS. 5a-5c show examples of function setting screen to be displayed on touch panel 16a of display/operation section 16 at the time of setting a function. For example, in cases of using a copy function, as an example of usable function in image forming apparatus, a screen is displayed for setting functions such as color, sheet, magnification, and copying method, as shown in FIG. 5a. When a button for setting the copy method is pushed, a screen for setting functions such as single sided/double sided and page aggregation is displayed as shown in FIG. 5b. Further, when a finishing tab is selected, a screen for setting functions such as sort/group, staple and punch is displayed as shown in FIG. 5c. When an original designation tab is selected, a screen for setting functions such as original binding margin and original setting direction is displayed as shown in FIG. 5d. When an image quality tab is selected, a screen for setting functions such as original image quality, density, and output image quality is displayed as shown in FIG. 5e, and further when an output image quality button is pushed, a screen for setting functions such as lightness, contrast, and chroma is displayed as shown in FIG. 5f. When an application tab is selected, a screen for setting functions such as the sheet binding margin, image repeat, booklet, page edition, and stamp/page print is displayed as shown in FIG.

Figure 5H:
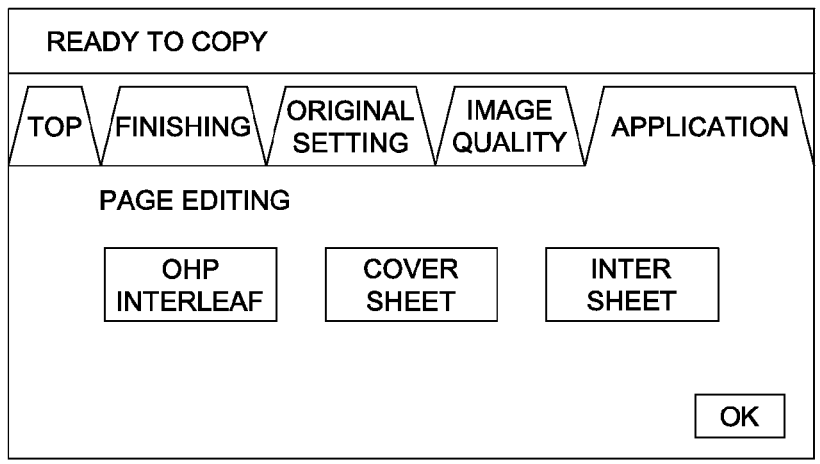
FIG. 5h another example of a screen displayed on the display/operation section of the image forming apparatus.
Figure 5I:
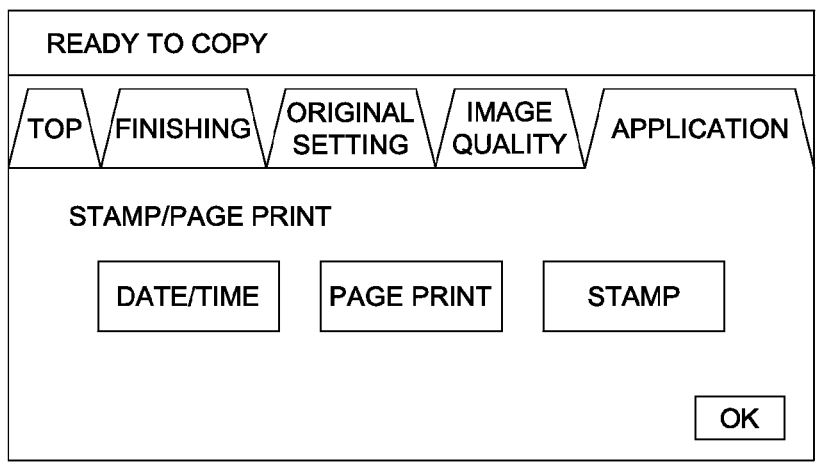
FIG. 5i another example of a screen displayed on the display/operation section of the image forming apparatus.

5g, and when a button for setting the page edition is pushed, a screen for setting functions such as OHP interleaf, cover sheet, and inter sheet is displayed as shown in FIG. 5h, and when a button for setting the stamp/page print is further pushed, a screen for setting functions such as date/time, page print, and stamp is displayed, as shown in FIG. 5i.

In this way, the function setting screen is likely to be a screen configuration divided to several hierarchy levels, and in cases of setting functions, it is required to select respective functions by transiting the plurality of screens. By this reason, operations may be complicated, and a large number of operations may be required in cases of setting a combination of necessary functions.

Thus, in the present embodiment, in order to improve the operability at the time of function setting, by displaying function setting screen on touch panel 16a of display/operation section 16, aggregating and arranging one or plurality of alternatives, selected by a user on the screen, on one page of sheet, synthesizing a pattern which being capable of position identification via electronic pen 30, onto an image arranged with each alternative and, printing on the sheet, and by selecting an alternative on the printed sheet, the function setting can be executed. An outline of operations of this method will be described by referring to FIGS. 6a-9d.

As one of the functions of system setting and adjusting of image forming apparatus 10, which is displayed when utility key 169 or the like of display/operation section 16 is pushed, a function setting print function is configured to be included, and by selecting the function setting print function, a screen for selecting the function to be used for the function setting print is displayed on touch panel 16a of display/operation section 16. FIG. 6a shows an example of function selection screen 40, where a list of various functions relating to copying is displayed. Although FIGS. 6a-6c are examples of screens enabling the function selection relating to the copy displayed on the screen of FIG. 5, a similar screen can be displayed for other functions such as facsimile and scanning.

Then, a user selects a desired function on function selection screen 40. FIG. 6b shows the state where four functions of "color", "original→copy" "sort/group", and "original image quality" are selected. In this state, when start key 16e of display/operation section 16 is pushed, control section (image processor chip 21) generates an image where alternatives of the selected functions are aggregated and arranged on one page, and combines the image and a pattern, allows printer engine 23 to print the combined image, and outputs function setting printed material 41 as shown in FIG. 6c. Although FIG. 6c shows the case where four functions are selected, the number, kind, arrangement print mode of functions are not restricted to this configuration of the figure.

Further, the control section correlates the selected function, alternatives of each function, and position information of each alternative on function setting printed material 41, and stores them in nonvolatile RAM 13b. FIG. 8 shows position information (coordinates) of each alternative of selected function, and FIG. 8 shows an example of a table that correlates functions, alternatives, and position information (coordinates) of diagonal positions of the image area for each alternative.

The user selects the alternative of each function by using electronic pen for function setting printed material 41. FIG. 9 schematically shows this operation. For example, as shown in FIG. 9a, when electronic pen 30 touches the image area of "full color" with respect to "color" function, electronic pen 30 specifies the coordinates (X, Y) from the pattern printed at the image area, image forming apparatus 10 receives this coordinates (X, Y) via communication module for electronic pen 17 and makes "full color" to be the setting condition, since this coordinates (X, Y) indicates the "full color" image area $(X_{A2-1}, Y_{A2-1})$-$(X_{A2-2}, Y_{A2-2})$ of the table (Table in FIG. 8) memorized in nonvolatile Ram 13b. At that time, the screen as shown at the right side of FIG. 9a is displayed on touch panel 16a of display/operation section 16.

Next, when as shown in FIG. 9b, electronic pen 30 touches the image area of "sort" with respect to "sort/group" function, image forming apparatus 10 similarly receives this coordinates (X, Y) via communication module for electronic pen 17 and makes "sort" to be the setting condition, since this coordinates (X, Y) indicates the "sort" image area $(X_{C2-1}, Y_{C2-1})$ $(X_{C2-2}, Y_{C2-2})$ of the Table in FIG. 8. At that time, the screen as shown at the right side of FIG. 9c is displayed on touch panel 16a of display/operation section 16.

Next, when as shown in FIG. 9c, electronic pen 30 touches the image area of "sort" with respect to "sort/group" function, image forming apparatus 10 similarly receives this coordinates (X, Y) via communication module for electronic pen 17 and makes "sort" as the setting condition, since this coordinates (X, Y) indicates the "sort" image area $(X_{C2-1}, Y_{C2-1})$-$(X_{C2-2}, Y_{C2-2})$ of the Table in FIG. 8. At that time, the screen as shown at the right side of FIG. 9c is displayed on touch panel 16a of display/operation section 16.

Further, when as shown in FIG. 9d, electronic pen 30 touches the image area of "map" with respect to "original image quality" function, image forming apparatus 10 similarly receives this coordinates (X, Y) via communication module for electronic pen 17 and makes "map" to be the setting condition, since this coordinates (X, Y) indicates the "map" image area $(X_{D2-1}, Y_{D2-1})$-$(X_{D2-2}, Y_{D2-2})$ of the Table in FIG. 8. At that time, the screen as shown at the right side of FIG. 9d is displayed on touch panel 16a of display/operation section 16.

The series of above operations will be described in detail by referring to charts of FIG. 10a, and FIG. 10b. In the description below, it is assumed that a user previously has selected functions via function selection screen 40, each alternative of each function selected by the user have been aggregated and arranged on one page of sheet and previously printed, and the table correlating functions, alternatives, and position information of image areas on function setting printed material 41 has been previously stored.

Firstly, the user takes out function setting material 41 from image forming apparatus 10, and touches an alternative of each function on function setting printed material 41 with electronic pen 30 (S100) at the place where communication between electronic pen 30 and communication module 34 is capable.

In electronic pen 30, when pen pressure detection sensor 37 detects a touch, CPU 31 recognizes the pattern read out by image sensor 36 and identifies the position on function setting printed material 41 from the pattern, and communication module 34 transmits the position information (S110). And communication module for electronic pen 17 of image forming apparatus 10 receives said position information (S120).

Next, the control section of image forming apparatus 10 verifies the function (or alternatives) correlated to said position information (S130). This step will be described in detail by referring to the flow chart of FIG. 10b.

First, the control section determines whether X coordinates of the received position information is within the range $X_{A1-1}$-$X_{A1-2}$ (S131), and in case of YES, determines whether Y coordinate of the received position information is within the range $Y_{A1-1}$-$Y_{A1-2}$ (S132). In cases where both S131 and S132 are YES, the control section determines that the function correlated to the position information is "color" and the alternative is "auto color", by referring to the Table in FIG. 8 (S133).

In cases where either S131 or S132 is NO, the control section determines whether X coordinate of the received position information is within the range $X_{A2-1}$-$X_{A2-2}$(S134) and in case of YES, determines whether Y coordinate of the received position information is within the range $Y_{A2-1}$-$Y_{A2-2}$ (S135). In cases where both S134 and S135 are YES, the control section determines that the function correlated to the position information is "color" and the alternative is "full color", by referring to the Table in FIG. 8 (S136).

By repeating the similar steps, the control section determines whether X coordinate of the received position information is within the range $X_{D4-1}$-$X_{D1-2}$(S137), and in case of YES, determines whether Y coordinate of the received position information is within the range $Y_{D4-1}$-$Y_{D4-2}$ (S138). In cases where both S137 and S138 are YES, the control section determines that the function correlated to the position information is "original image quality" and the alternative is "map", by referring to the Table in FIG. 8 (S139).

Returning to FIG. 10a, the control section determines, as the result of verification, whether the function (or alternative) correlated to the position information is available (S140), and if there is no correlated function (alternative), terminates the process, and if further there is a correlated function (or alternative), the control section sets the function based on the selected alternative, and displays the screen for example shown in the right side of FIGS. 9a-9d (S160).

As described above, the present embodiment displays function setting screen 40, forms an image where alternatives of the function selected by a user are aggregated and arranged on one page of sheet, and by synthesizing a pattern, capable of identifying the position by electronic pen 30, onto the image, prints function setting printed material 41. By using this function setting printed material 41, the user can set the function with electronic pen 30. Thus the operability at the time of function setting can be remarkably improved.

The present invention is not restricted to the above described embodiment, and configurations of each apparatus and control may be arbitrarily changeable without departing from the spirit and scope of the present invention.

For example, in the above described embodiment, the configuration is such that on an image where alternatives of the function selected by a user are aggregated and arranged on one page, and a composite image combined with a pattern is printed on a sheet, however, another configuration is possible such that by outputting data of said composite image to a device such as electronic paper provided with a display function, displaying the composite image on a display screen of the device, and sets the function of image forming apparatus 10 on this display screen.

As described in the above first embodiment, an image forming apparatus reflecting one aspect of the present invention includes:

a display section to display screens for setting a function;

a control section to form an image where alternatives of a function to be set by transiting plural screens are aggregated and arranged on one page of sheet, and to form a composite image where a position detection code for identifying a position on the sheet is combined with the image;

a memory section to store a table which correlates each of the alternatives with a position of each of the alternatives on the sheet; and a print section to print the composite image on the sheet, wherein in cases where the control section acquires the position information having been identified of the position by the position detection code on the sheet, the control section refers to the table to identify an alternative corresponding to the position information, and sets a function based on the identified alternative.

Further, as described in the above first embodiment, in a function setting method of the image forming apparatus in a system where an image forming apparatus and an electronic pen, reflecting another aspect of the present invention, the image forming apparatus executes the steps of:

forming an image where alternatives, of the function to be set by transiting the screens, are aggregated and arranged on one page of sheet, and forming a composite image where a position detection code for identifying a position on the sheet is combined with the image;

storing a table which correlates each of the alternatives with the position of the alternative on the sheet;

printing the composite image on a sheet;

obtaining position information specified through the detection of the detection code by the electronic pen; and specifying the alternative corresponding to the position information by referring to the table, and setting the function based on the specified alternative.

According to the image forming apparatus and the image forming method of the present embodiment, even a function, which requires transition of screens in case of function setting, can be easily executed of the setting.

This is due to that when a user selects a function on a panel of image forming apparatus, the image forming apparatus aggregates and arranges alternatives of the selected function on one page of sheet, prints an image in which position information on the page is allocated to each alternatives on the sheet, and when acquires the position information, executes the setting of the function by specifying the alternative corresponding to the acquired position information.

[Second Embodiment]

As described in the description of prior art, accompanied by multiplication of functions in MFP, operations for setting functions are becoming complicated, and having been proposed is a method for making a function executable by use of a sheet divided into areas for each function. By this technology, function setting materials for each user can be formed. However, in cases where after a user forms and prints his/her own function setting printed material, prints the same material again, prints by editing the material, or forms and prints his/her own function setting printed material by reference of the material formed by the other user, the user needs to select the functions again, which prevents easy formation of the function setting printed material.

And so, in the second embodiment of the present invention, by storing the layout information (selected functions and position information of each function on the sheet) of the previously formed function setting printed material in correlation with user ID, when a prescribed user logs-in to the image forming apparatus, the layout information, stored by correlating to ID of the user and/or ID of users in a department where the user belongs, is displayed in selectable manner, and based on the selected layout information, a new function setting printed material for the prescribed user is made to be printed. In this way, by making the previously formed function setting printed materials usable, re-selection of the function is not required and simple and easy forming of the function setting printed materials is enabled.

For explaining the above described embodiment of the present invention further in detail, the image forming apparatus and function setting method relating to the second embodiment of the present invention will be described by referring to FIGS. 1-16. Since configurations, operations and functions of the present embodiment relating to FIGS. 1-10 are similar to those described relating to the first embodiment, repeated description regarding the same items will be omitted.

In the second embodiment, the control section of image forming apparatus 10 in FIG. 1 is configured with CPU 11 and memories such as ROM 12, RAM 13a, and nonvolatile RAM 13b. After copying a control program stored in ROM 12 onto RAM 13a, CPU 11 executes the total control with respect to each function such as a scanner function, facsimile function, print function, and copy function based on the control program on RAM 13a. In the present embodiment the control section executes a process of arranging (preferably by aggregating into one page of sheet) one or plural functions selected by a user using the function selection screens (FIGS. 5a-5i) and their alternatives on a sheet, on which a pattern for electronic pen 30 to detect the position of its pen tip, and forms a sheet (referred as a function setting printed material) for setting the function of own apparatus, a process of storing the information (layout information) associating each function of the formed function setting printed material with position information on the sheet, by correlating to a user ID into a memory, a process of identifying and displaying in selectable manner the layout information stored by correlating to the inputted user ID, and a process of forming a new function setting printed material based on the selected layout information, and a process of identifying the alternative corresponding to the position information (coordinates) on the sheet transmitted from electronic pen 30 to set the function. In addition to the above control program, ROM 12 stores said pattern (for example, codes for position detection such as ANOTO™ pattern). RAM 13a, is used as a site of temporarily storing, in addition to the control program, screen data to be displayed on display/operation section 16, layout information, tables correlating various information (tables in FIGS. 12-15), various calculated values and the like. Further, in cases where these data need to be memorized even at the time of power off, these are stored in nonvolatile RAM 13b.

By the same procedure as that described in the first embodiment, function setting printed material 41 is formed, and by use of this function setting printed material 41 and electronic pen 30, the function of image forming apparatus 10 can be set. However, in cases where the user, who formed said function setting printed material 41, tries to form and print his/her own function setting printed material, prints the same material 41 again, to print by editing the material, or form and print his/her own function setting printed material by reference of the material formed by the other user, the user needs to select the functions again with function selection screen 40, which is cumbersome. Particularly, in cases where function selection screen 40 has a hierarchical structure and the function needs to be selected by transiting plural screens, it takes long time for selecting the function.

Therefore the present embodiment, by storing in a memory the layout information of function setting printed material 41 formed by the above procedure by associating with the user who instructed to form said function setting printed material 41, enables to refer the layout information of the previously formed function setting printed material 41, at the time of forming new function setting printed material 41.

For example, tables as shown in FIGS. 12-15 are stored in a memory so that desired layout information can be identified. FIG. 12 is a table correlating a user ID for identifying the user, who formed function setting printed material 41, a sheet ID for identifying function setting printed material 41, and a pattern ID for identifying the layout pattern of function setting printed material 41. FIG. 13 is a table correlating a user ID, a name of the user, and a department ID for identifying the department where the user belongs. FIG. 14 is a table correlating a sheet ID, an access type specifying public or private treatment of function setting printed material 41 and a default attribute of the access type. FIG. 15 is a table correlating a sheet ID and layout information of function setting printed material 41.

In cases where a user, who logs-in to image forming apparatus 10, inputs user ID and instructs the formation of function setting printed material 41, the control section of image forming apparatus 10 identifies one or more sheet ID associated with the user ID (for example, in ease of user ID being "0001", the sheet ID is "0001"), and by using a table of FIG. 15, identifies the layout information correlated with the identified sheet ID.

In that case it is supposed that users of same type of work use the same type of functions of image forming apparatus 10, therefore it will be convenient if users can use function setting table 41 formed by each users belonging in the same department as the logged-in user. And so, in such cases, the control section identifies one or more user ID belonging to the same department ID as the inputted user ID (for example, if the inputted ID is "0001", identifies the sheet IDs "0001", "0002", and "0003"), and by using the table of FIG. 12, identifies the sheet ID correlated to the user ID (in the above case, sheet IDs "0001", "0002", and "0003"), and by using the table of FIG. 15, identified the layout information correlated to the identified sheet ID.

Further, since work contents of a user may be analogized from configurations of function setting printed material 41, a user may not want the disclosure of function setting printed material 41 formed by the user. In such cases, at the time of registering function setting printed material 41 in association with the user ID, by setting whether to be public or private, describing in a table such as FIG. 14, the control section identifies the sheet ID having been set as "public" among the sheet IDs specified via the above means, and identifies the layout information correlated to the identified sheet ID, by using the table of FIG. 15.

Thus, the control section displays the identified layout information on touch panel 16a, and enables the formation of a new function setting printed material 41 by referring to the previously formed function setting printed material 41.

Figure 11:
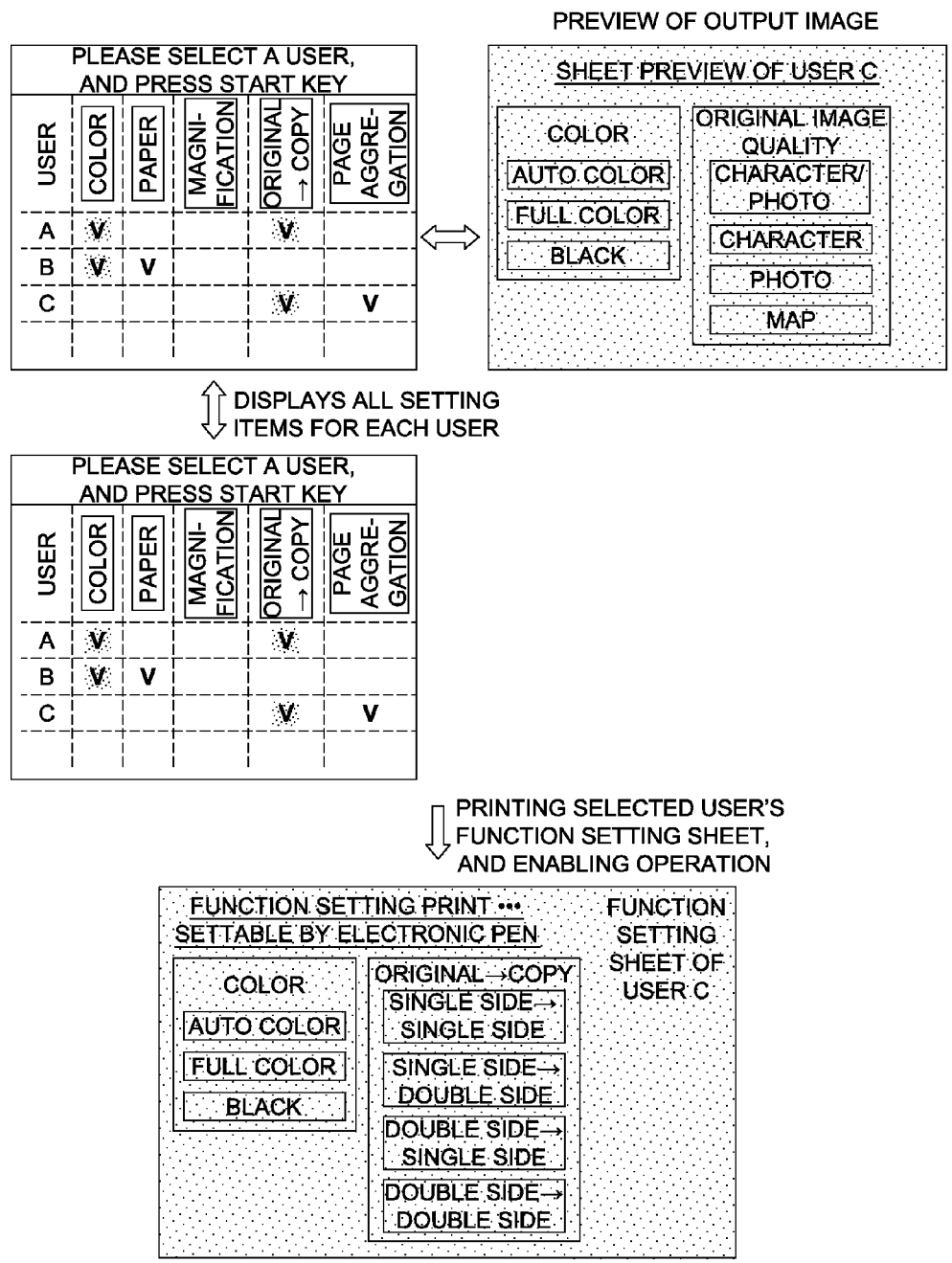
FIG. 11 is a diagram showing a procedure of forming a function setting printed material relating to one embodiment of the present invention.

For example, as shown in FIG. 11, when a user logged on image forming apparatus 10 and presses utility key 16g of display/operation section 16 to instruct the formation of function setting printed material 41, the control section identifies the layout information correlated to the user ID of the logged-in user, and displays the screen as shown in the left side of FIG. 11. In this screen, a table of functions specified by layout information for each user is displayed, and the logged-in user selects a user corresponding to the layout selected of desired function for setting.

When the user is selected, the control section identifies the sheet ID stored by associating with the user ID of the logged-in user, identifies the layout ID associated with the sheet ID, forms an output image of function setting printed material 41 (or a function setting sheet) based on the layout image as necessary, and displays the preview as shown in the right side of FIG. 11 on touch panel 16a.

And, when the logged-in user confirms the preview and presses start key of display/operation section 16, the control section prints, based on the selected layout information, a new function setting printed material 41 or a function setting sheet (a duplication of previously formed function setting printed material 41, or a function setting printed material 41 formed by editing the previously formed function setting printed material 41) as shown at the bottom of FIG. 11.

Figure 16:
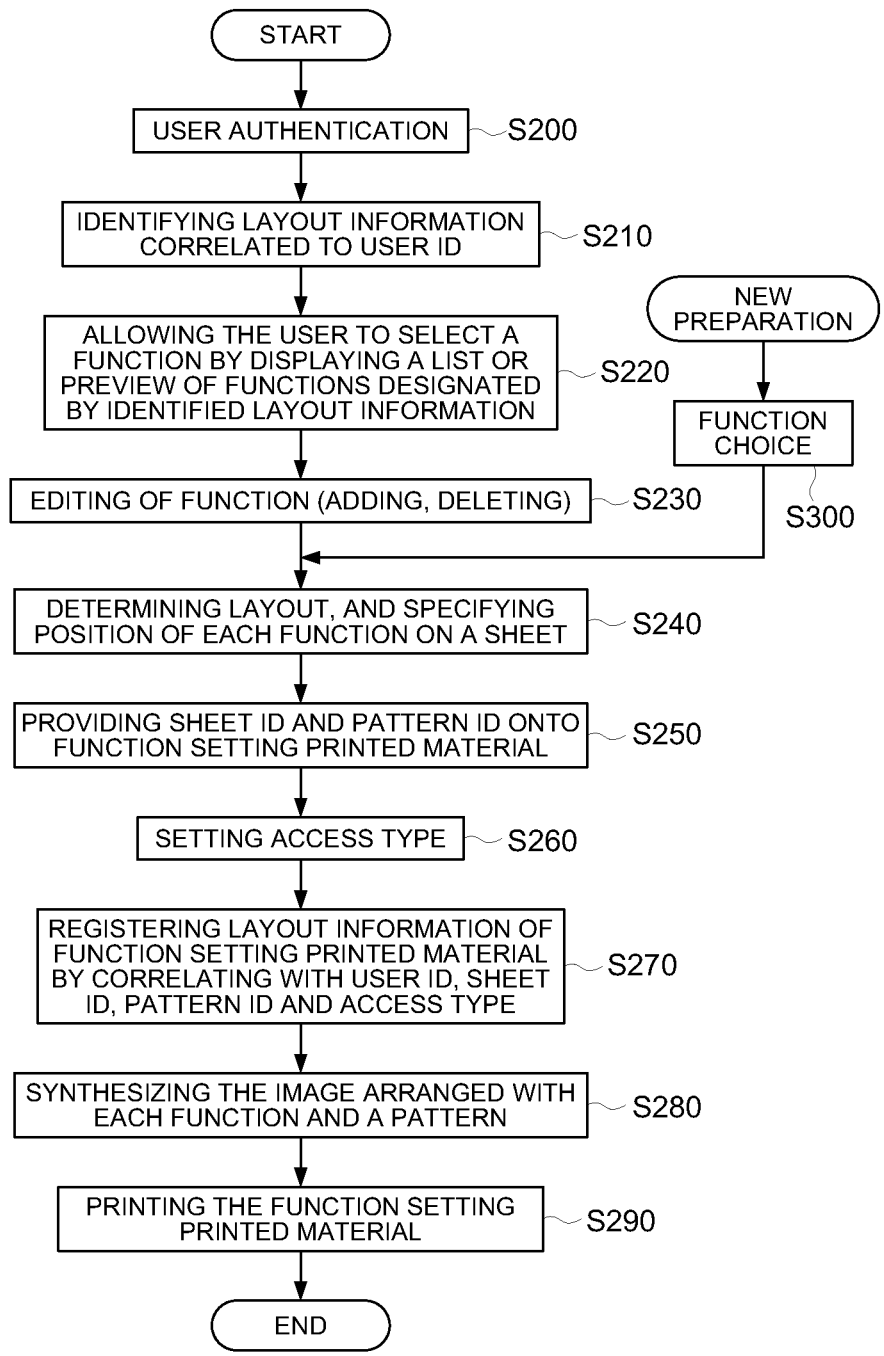
FIG. 16 is a flow chart showing operations of image forming apparatus (procedures of forming function setting printed material) relating to one embodiment of the present invention.

A series of these operations (procedures of forming a new function setting printed material 41 by referring to the previously formed function setting printed material 41) will be described in detail with reference to the flow chart of FIG. 16. Wherein, correlation tables shown in FIGS. 12-15 are assumed to be previously formed and registered in a memory.

Firstly, image forming apparatus 10 executes a user authentication based on the user ID inputted by a user by operating display/operation section 16, and accepts a login if the result of authentication is OK (S200).

Next., when the user presses utility key and the like of display/operation section 16 and indicates formation of function setting printed material 41, the control section identifies one or more layout information stored by associating with the inputted user ID (S210). At this time, as described above, the control section may identify the layout information associated and stored with the user ID of the same department ID as the logged-in user ID, and further may identify the layout information whose access type is set to be "public". Further, in cases where there is no layout information associated and stored with the user ID (for example, a case where the user forms function setting printed material 41 for the first time), the control section may identify the layout information in which prescribed functions are previously set as a default.

Next, the control section displays a screen displaying a table of functions specified by the identified layout information, and a preview screen of function setting printed material 41 formed based on the layout information selected from the identified layout information, and allows the user to select desired layout information (S220).

Next, the control section displays, as necessary, a screen for editing the layout information selected by the user on touch panel 16a, and the user executes the editing of adding or deleting function and the like, by operating display/operation section 16 (S230).

Upon completion of the function editing, the control section determines the layout according to the editing contents, and specifies the position of each function on the sheet (S240).

Next, the control section provides a sheet ID and a pattern ID on the edited layout information (S250), and sets as necessary an access type that specifies whether to disclosure or nondisclosure of function setting printed material 41 to other users (S260).

And, the control section registers the edited layout information by associating with user ID, sheet ID, pattern ID, and access type in a memory (S270). In cases where the editing of function is not executed in S230, the steps S230-S270 can be omitted.

Next, based on the layout information selected/edited by the user, the control section forms an image where the function specified by said layout information is arranged at the specified position on the sheet (preferably aggregated and arranged on one page of the sheet), combines the image and a pattern (S280), allows printer engine 23 to print the combined image and outputs a new function setting printed material 41 (S290).

Meanwhile, in case of forming a new function setting printed material 41 without referring to a previously formed function setting printed material 41, a user, by operating display/operation section 16, selects a desired function from function selection screen 40 displayed on touch panel 16a and the like (S300), and executes the above described process of S240-S290.

In this way, the present embodiments stores the layout information of previously formed function setting printed material 41 by associating with a user ID, and when a user ID is inputted, displays the lay out information stored in association with the user ID in selectable manner, and prints a new function setting printed material 41 based on the layout information selected from the displayed layout information, therefore, works for setting the function again can be omitted and the new function setting printed material can be easily formed.

The present invention is not limited to the above embodiment, but each structure or control may be changeable without departing from the scope of the invention.

For example, although in the above embodiment, the configuration of printing function setting printed material 41 is described, other configuration, for example, may be feasible where by outputting the data of composite image, in which a pattern is combined with the image arranged of functions, on a device provided with a display function such as an electronic paper, displaying the combined image on a display screen of the device, and the function of image forming apparatus 10 is made settable on the display screen.

Further, although in the above embodiment, the case of forming function setting printed material 41 for the function of own apparatus is described, the configuration may be similarly applicable to the cases, for example, of forming function setting printed material 41 of any of the apparatuses in a system provided with plural image forming apparatuses 10, such that a prescribed image forming apparatus 10 in the system forms function setting printed material 41 for the other image forming apparatus 10.

Further, although in the above embodiment, the system being configured with image forming apparatus 10 and electronic pen 30 is described, in a system configured with a computer apparatus of a user and management apparatus, the computer apparatus and/or the management apparatus may instruct the formation of a new function setting printed material 41 based on the layout information of function setting printed material 41 which has been previously formed by image forming apparatus 10. In that case, the layout information of previously formed function setting printed material 41 is only required to be stored in a memory section referable by the computer apparatus and the management apparatus.

As described in the second embodiment, an image forming apparatus, being capable of communicating with an electronic pen, includes:

a print section to form a function setting printed material which allocates areas for setting functions of the image forming apparatus on a sheet printed with position detection codes for detecting a position of pen tip of the electronic pen;

a memory section to memorize layout information correlating each function and position information of the each function on the sheet with an ID of a user who has instructed to form the function setting printed material; and a control section, in cases where a user logs-in by inputting a user ID, to identify the layout information memorized by correlating with the ID of the user having logged-in, and to display the identified layout information on the display section in selectable manner, wherein the control section controls the print section to form a new function setting printed material based on the layout information selected by the user who logged-in. Further, as described in the second embodiment, in a printed material forming method for setting a function of an image forming apparatus which is capable of communication with an electronic pen, the image forming apparatus executes:

a first printing step to form a function setting printed material allocating areas for setting functions of the own apparatus on a sheet where position detection codes for detecting a position of pen tip of the electronic pen is printed;

a memorizing step to memorize layout information correlating each function with position information of the each function on the sheet with an ID of a user who indicated to form the function setting printed material;

displaying step to display the specified layout information on the display section in selectable manner, by specifying the layout information memorized by correlating with the ID of the user having logged-in, in cases where a user logs-in by inputting a user ID; and a second printing step to form a new function setting printed material based on the layout information selected by the user having logged-in.

According to the image forming apparatus and the printed material forming method relating to the second embodiment, a desired function setting printed material can be easily formed by effectively utilizing a previously formed function setting printed material.

This is due to that layout information of a previously formed function setting printed material is memorized in association with a user ID, and when a user, who logs-in on the image forming apparatus, inputs a user ID, the layout information associated and stored with the inputted user ID is displayed in selectable manner, and a new function setting printed material for the logged-in user is printed based on the selected layout information.

[Third Embodiment]

As described in the description of prior art, accompanied by multiplication of functions in MFP, operations for setting functions are becoming complicated, and having been proposed a method for making a function executable by use of a sheet divided into areas for each function. However according to this method, in case of setting a function by transiting plural screens, a function setting by using plural sheets is required. Further, since predetermined functions are previously printed on the sheet, there may be a case where a user cannot select the function. Further in the system connected with plural image forming apparatuses, respective sheets for setting the function of each image forming apparatus are required to be prepared, which makes the setting operation cumbersome.

And so, the third embodiment of the present invention, a system is configured: by forming an image where alternatives for selecting an image forming apparatus connected to a network, and alternatives of the function to be set by transiting plural screens are aggregated and arranged on one page of sheet, printing the image on a sheet by associating coordinates with each alternatives on a sheet, and when acquiring the coordinates of the alternative selected by a user, identifying the image forming apparatus and the function selected by the user, to instruct for the identified image forming apparatus to set the identified function. As just described, by making settable of the function, which needs to be set across the plural pages, on one sheet, operability at the time of function setting can be remarkably improved. And by controlling and utilizing the information necessary to realize this configuration with the management server on the network or with each of the image forming apparatuses, the plural image forming apparatuses connected to the network are made usable of said sheet.

For explaining the embodiment of the present invention further in detail, a print system and function setting method relating to the third embodiment of the present invention will be described by referring to FIGS. 1-10b and FIGS. 17-19b.

Since configurations, operations and functions of the image forming apparatus and electronic pen of the print system in the present embodiment relating to FIGS. 1-10b are similar to those described relating to the first embodiment, repeated description regarding the same items will be omitted.

Figure 17:
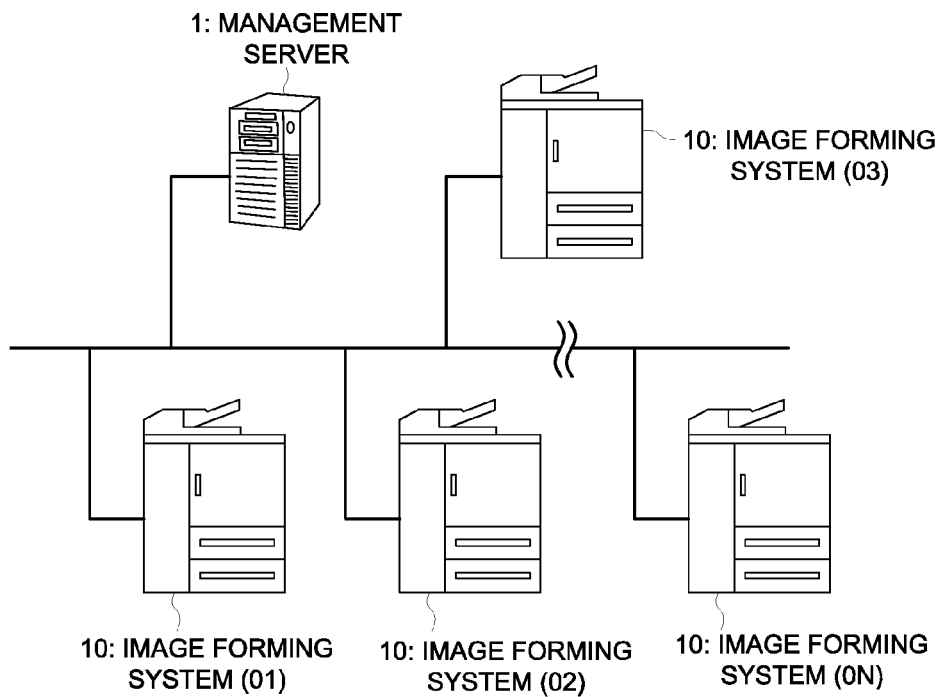
FIG. 17 is a diagram showing a network structure of a printing system relating to one embodiment of the present invention.
Figure 18:
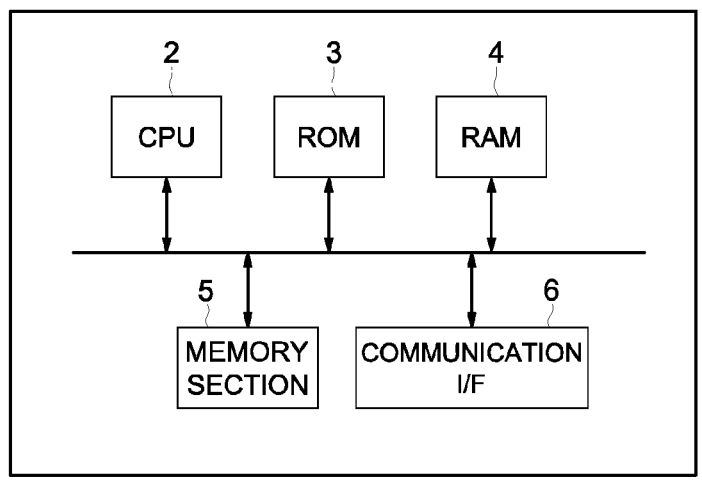
FIG. 18 is a diagram showing a configuration of management server relating to one embodiment of the present invention.
Figure 19A:
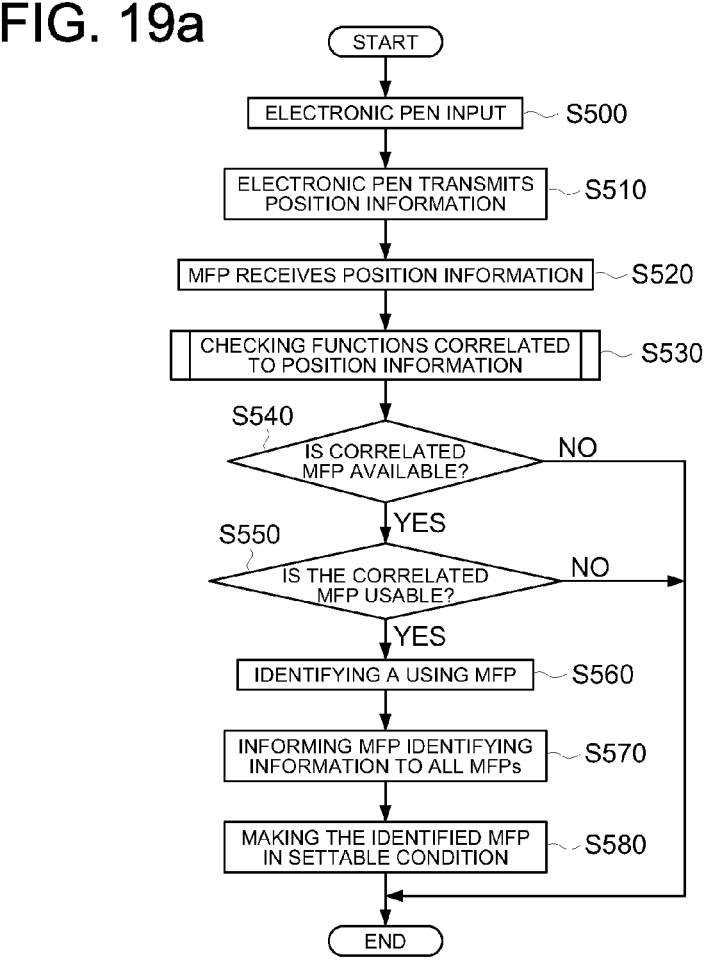
FIGS. 19a and 19b are flow charts showing the operations of the image forming apparatus relating to one embodiment of the present invention.
Figure 19B:
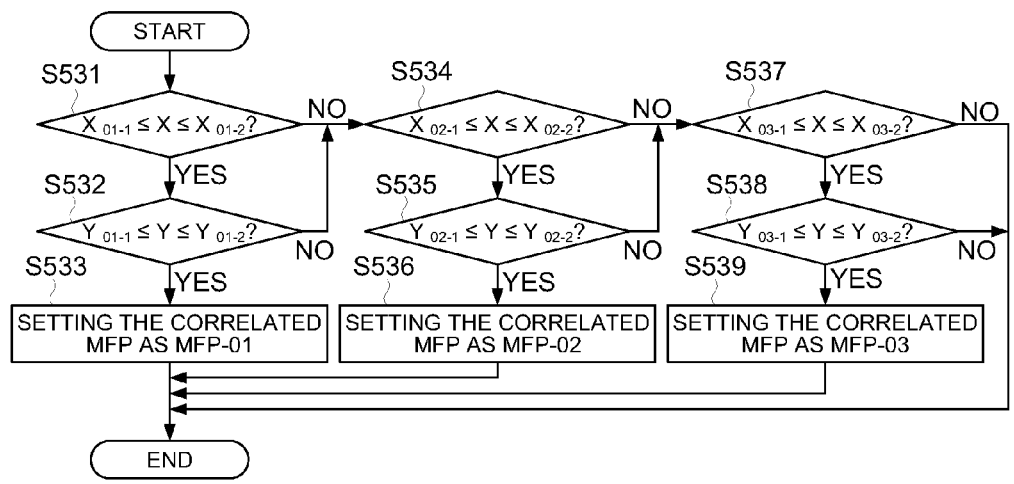

FIG. 17 is a diagram showing a network structure of a print system relating to one embodiment of the present invention. FIG. 18 is a block diagram showing a configuration of management server relating to one embodiment of the present invention. And FIGS. 19a and 19b are flow charts showing the operations of the image forming apparatus relating to one embodiment of the present invention.

Print system of the present embodiment is configured with an image forming apparatus such as MFP, a management server to memorize MFP management information of the MFP connected on a network, and an electronic pen to specify and transmit position information on a sheet printed by the image forming apparatus.

[Network Structure]

FIG. 17 is a diagram showing a network structure of a print system of the present embodiment. Management server 1, image forming apparatus 10 (image forming apparatus 01, 02, 03, 0N) and the like are connected on a network such as LAN (Local Area Network) or WAN (Wide Aria Network).

[Management Server]

FIG. 18 is a block diagram showing a configuration of management server 1 of the present embodiment. Management server 1 of the present embodiment is configured with CPU (Central Processing Unit) 2, ROM (Read Only Memory) 3, RAM (Random Access Memory) 4, memory section 5, communication interface 6 and the like.

The control section is configured with CPU 2, ROM 3, and RAM 4. After copying a control program stored in ROM 3 onto RAM 4, CPU 2 executes the total control of management server 1. The control section receives position information from the image forming apparatus communicating to electronic pen 30, identifies the alternative corresponding to the position information (coordinates) on the sheet (function setting printed material) by referring to a table stored in memory section 5, identifies the image forming apparatus and the function to be set on the image forming apparatus selected via function setting printed material, and executes the process of instructing the setting of the identified function with respect to the identified image forming apparatus.

Memory section 5, configured with a HDD (Hard Disk Drive) and the like, stores information (such as its address on the network and apparatus conditions) relating to each image forming apparatus 10 connected to the network, a table correlating position information on the function setting printed material to alternatives of the image forming apparatuses and functions, and data of a pattern (for example, position detecting code such as ANOTO™ pattern) for detecting the position on the sheet via electronic pen 30.

Communication interface 6, configured with a NIC (Network Interface Card), a modem and the like, connects management server 1 to the network.

[Image Forming Apparatus]

The control section of the third embodiment is configured with CPU 11, ROM 12, RAM 13a, and RAM 13b shown in FIG. 1. After copying the control program stored in ROM 12 into RAM 13a, CPU 11 executes, based on the control program on RAM 13a, the total control of respective functions such as a scanner function, a facsimile function, a printing function, and a copying function. In the present embodiment the control section specifically executes: a process of aggregating and arranging, on one page of sheet, alternatives for selecting image forming apparatus 10, to set a function, among the plurality of image forming apparatus 10 on the network, and alternatives of one or plural functions selected by a user, onto one page of sheet; a process of transmitting the position information received from the table correlating the position information on the sheet to the alternatives via electronic pen 30; and a process of setting the function based on an instruction from the management server 1. RAM 13a is used for a temporary storage site of image data to be displayed on display/operation section 16, in addition to the control program. Further, in cases where these data are necessary to be stored even after power off of image forming apparatus 10, the data is stored in nonvolatile RAM 13b.

Although the present embodiment is configured such that image forming apparatus 10 transmits the position information received from electronic pen 30 to management server 1, and management server 1 identifies alternatives of an image forming apparatus and a function, and instructs the image forming apparatus subject to the function setting to set the function, another configuration is also feasible where image forming apparatus 10 identifies the alternatives of the image forming apparatus and the function based on the position information received from electronic pen 30, and transmits the identified information to management server 1, then management server 1 instructs the image forming apparatus subject to the function setting to set the function. Further, still another configuration is possible where one image forming apparatus 10 stores the information (such as addresses on the network, and conditions of the apparatuses) relating to the other image forming apparatuses 10 on the network, and said image forming apparatus 10 identifies the alternatives of the image forming apparatus and the function based on the position information received from electronic pen 30, and directly instructs the image forming apparatus subject to the function setting to set the function. In this case management server can be omitted.

FIGS. 19a and 10b are flow charts showing printing operations (procedures of identifying the image forming apparatus to be used, and procedures of setting the function of the image forming apparatus) of the printing system of the third embodiment. In the description below, it is assumed that a user has previously selected functions via function selection screen 40, alternatives of image forming apparatuses on the network and each alternative of each function selected by the user have been aggregated and arranged on one page of sheet and previously printed to form function setting printed material 41, and the table correlating the image forming apparatus, functions, alternatives, and position information of image areas on function setting printed material 41 has been previously stored. And, there are three units of image forming apparatuses on the network.

Firstly, the user takes out function setting material 41 from the image forming apparatus, and touches an alternative of each function on function setting printed material 41 with electronic pen 30 (S500) at the place where communication between communication module 17 for electronic pen of the image forming apparatus and communication module 34 of electronic pen 30 is capable.

In electronic pen 30, when pen pressure detection sensor 37 detects a touch, CPU 31 recognizes the pattern read out by image sensor 36 and identifies the position on function setting printed material 41 from the pattern, and transmits the position information via communication module 34 (S510). And communication module for electronic pen 17 of image forming apparatus 10 receives said position information (S520).

Next, the image forming apparatus transmits the received position information to management server 1, and the control section of the management server 1 verifies the alternatives of the image forming apparatus and the function correlated to the position information (S530). This step will be described in detail by referring to the flow chart of FIG. 19b.

Firstly, the control section determines whether X coordinates of the received position information is within the range $X_{O1-1}$-$X_{O1-2}$ (S531), and in case of YES, determines whether Y coordinate of the received position information is within the range $Y_{O1-1}$-$Y_{O1-2}$ (S532). In cases where both S531 and S532 are YES, the control section determines that the image forming apparatus correlated to the position information is "MFP-01" (S533) by referring to the Table in FIG. 8.

In cases where either S531 or S532 is NO, the control section determines whether X coordinate of the received position information is within the range $X_{O2-1}$-$X_{O2-2}$ (S534) and in case of YES, determines whether Y coordinate of the received position information is within the range $Y_{O2-1}$-$Y_{O2-2}$ (S535). In cases where both S534 and S535 are YES, the control section determines that the image forming apparatus correlated to the position information is "MFP-02" (S536) by referring to the Table in FIG. 8.

In cases where either S534 or S535 is NO, the control section determines whether X coordinate of the received position information is within the range $X_{O3-1}$-$X_{O3-2}$ (S537) and in case of YES, determines whether Y coordinate of the received position information is within the range $Y_{O3-1}$-$Y_{O3-2}$ (S538). In cases where both 5537 and 5538 are YES, the control section determines that the image forming apparatus correlated to the position information is "MFP-03" (S539) by referring to the Table in FIG. 8.

Also regarding the function, the control section determines whether X coordinates of the received position information is within the range $X_{A1-1}$-$X_{A1-2}$, and in case of YES, determines whether Y coordinate of the received position information is within the range $Y_{A1-1}$-$Y_{A1-2}$. In cases where both are YES, the control section determines that the function correlated to the position information is "color" and the alternative is "full color", by referring to the Table in FIG. 8. By repeating the similar steps, the control section determines whether X coordinate of the received position information is within the range $X_{D4-1}$-$X_{D4-2}$, and in case of YES, determines whether Y coordinate of the received position information is within the range $Y_{D4-1}$-$Y_{D4-2}$. In cases where both are YES, the control section determines that the function correlated to the position information is "original image quality" and the alternative is "map", by referring to the Table in FIG. 8.

Returning to FIG. 19a, the control section determines, as the result of verifying, whether the image forming apparatus correlated to the position information is available on the network (S540), and if YES, determines whether said image forming apparatus is usable (S550). And, if there is no correlated image forming apparatus, or the image forming apparatus is not usable, terminates the process, and if there is a correlated image forming apparatus on the network and being usable, the control section identifies said image forming apparatus to be used (S560).

Next, the control section notifies all image forming apparatuses on the network of the information identifying the image forming apparatus (S170). The identified image forming apparatus recognizes that the apparatus itself has become a subject, and makes itself in conditions being able to set a function (S580). Management server 1 sends the information identifying the function and the alternatives having been selected via function setting printed material 41, and instructs the setting of the function. Then, the image forming apparatus sets the function according to the instruction of management server 1, and displays the screens as shown in the right side of FIGS. 9a-9d, on touch panel 16a of display/operation section 16.

As described above, the present embodiment displays function setting printed material 41, forms an image in which the alternatives of image forming apparatuses on the network and the alternatives of the function selected by a user are aggregated and arranged on one page of sheet, prints to form function setting printed material 41 by combining a pattern with which electronic pen 30 can identify the position to said image, and then the function setting is enabled with electronic pen 30 by using said function setting printed material 41. Therefore, the operability at the time of function setting can be remarkably improved. Further, since functions of the all image forming apparatuses on the network can be set by using one sheet of function setting printed material 41, user's convenience can be significantly improved.

In the above flow, although management server 1 conducted the process of verifying (S530) the image forming apparatus and function correlated to the position information, the configuration is also possible where the image forming apparatus, having received the position information from electronic pen 30, conducts said process and sends the results of verification to management server 1. Further, in the above flow, although management server 1 conducted the processes of identifying the image forming apparatus and instructing the function setting (S540-S580), the configuration is also possible where the image forming apparatus, having received the position information from electronic pen 30, conducts said processes.

As described in the above described third embodiment, a printing system of the present invention is configured with a plurality of image forming apparatuses and a management server connected with the plurality of image forming apparatuses via a network to manage the plurality of image forming apparatuses, where each of the image forming apparatuses including:

a display section to display screens for setting functions;

a control section to execute a process of forming an image in which alternatives of a function to be set by transiting a plurality of the screens, and alternatives to specify an image forming apparatus under management of the network are aggregated and arranged in one page of sheet, and forming a composite image by combining a position detection code to identify a position on the sheet with the image; a process of forming a table to correlate each of the alternatives with a position of each of the alternatives on the sheet, and transmitting the table to the management server; a process, in cases where the control section acquires position information identified by the position detection code on the sheet, of transmitting the position information to the management server; and a process of setting a function based on an instruction from the management server, and a print section to print the composite image on the sheet, and the management server including:

a memory section to store the table; and a control section to execute, in cases where the control section acquires the position information from the image forming apparatus, a process of identifying an alternative corresponding to the position information, and a process of instructing to set a function specified by the identified alternatives, to an image forming apparatus specified by the identified alternatives.

Further, as described in the above described third embodiment, a printing system of the present invention is configured with a plurality of image forming apparatuses and a management server connected with the plurality of image forming apparatuses via a network to manage the plurality of image forming apparatuses, where each of the image forming apparatuses including:

a display section to display screens for setting functions;

a control section to execute a process of forming an image in which alternatives of a function to be set by transiting a plurality of the screens, and alternatives to specify an image forming apparatus under management of the network are aggregated and arranged in one page of sheet, and forming a composite image by combining a position detection code to identify a position on the sheet with the image; a process of, in cases where the control section acquires position information identified by the position detection code on the sheet, identifying an alternative corresponding to the position information by referring to a table correlating each of the alternatives with a position of each of the alternatives on the sheet, and transmitting the identified alternative to the management server; and a process of setting a function based on an instruction from the management server, and a print section to print the composite image on the sheet, and the management server including:

a control section to execute, in cases where the control section acquires the identified alternative from the image forming apparatus, a process of instructing to set the function specified by the identified alternative, to an image forming apparatus specified by the identified alternative.

Still further, as described in the above described third embodiment, in a printing system of the present invention configured with a plurality of image forming apparatuses connected with each other via a network, where each of the image forming apparatuses including:

a display section to display screens for setting functions;

a control section to execute a process of forming an image in which alternatives of a function to be set by transiting a plurality of the screens, and alternatives to specify an image forming apparatus under management of the network are aggregated and arranged in one page of sheet, and forming a composite image by combining a position detection code to identify a position on the sheet with the image; a process of, in cases where the control section acquires position information identified by the position detection code on the sheet, identifying an alternative corresponding to the position information by referring to a table correlating each of the alternatives with a position of each of the alternatives on the sheet; and a process of instructing to set the function specified by the identified alternative, to an image forming apparatus specified by the identified alternative; and a process of setting a function based on an instruction from another image forming apparatus of the plurality of image forming apparatuses, and a print section to print the composite image on the sheet.

According to the printing system and function setting method of the present embodiment, even a function, which requires transition of screens in case of function setting, can be easily executed of the setting, and this setting can be similarly conducted for every image forming apparatuses connected to a network.

This is due to that the system forms an image in which alternatives to specify an image forming apparatus connected to the network and alternatives of functions are aggregated and arranged in one page of sheet, and position information is allocated, and prints the image on a sheet, and in cases acquiring position information from the sheet, identifies the image forming apparatus and the function corresponding to the position information, and instructs setting of the specified function to the designated image forming apparatus.

The present invention is not restricted to the above described embodiment, and configurations of each apparatus and control may be arbitrarily changeable without departing from the spirit and scope of the present invention.

For example, in the above described embodiment, the configuration is such that on an image where alternatives of the image forming apparatuses on the network and alternatives of the function selected by a user are aggregated and arranged on one page, and a composite image combined with a pattern is printed on a sheet, however, another configuration is possible such that by outputting data of said composite image to a device such as electronic paper provided with a display function, displaying the composite image on a display screen of the device, and sets the function of image forming apparatus 10 on this display screen.

Although, in the above described embodiment the case of setting the function of image forming apparatus 10 is described, the embodiment can be similarly applicable to an arbitrary apparatus which requires of transiting plural screens at the time of setting functions.

What is claimed is:

1. An image forming apparatus comprising:
   a display which is configured to display at least one screen from among a plurality of screens for setting a function among a plurality of functions of the image forming apparatus, the screens comprising adjustments corresponding to the function;
   an operation section which is operable by a user to select one or more functions from among the plurality of functions displayed on the display, wherein the one or more functions selected by the user are to be printed on a sheet along with adjustments thereof, the selected one or more functions corresponding to the functions which are settable via the screens;
   a controller configured to aggregate and arrange the one or more functions which are selected by the user, along with the adjustments of each selected function, and to generate a composite image comprising representations of the selected functions and the corresponding adjustments which are selectable from the screens;
   a print section to print the composite image including the representations of the functions selected by the user via the operation section and the corresponding adjustments onto a sheet; and
   a memory section which stores the functions selected by the user via the operation section and the corresponding adjustments in association with position information of positions on the sheet at which the corresponding representations included in the composite image are printed, wherein the selected functions and the corresponding adjustments are settable by the user via use of a selection device which is capable of sending position information to the controller corresponding to positions on the sheet at which the representations are printed, according to a selection made by the user using the selection device on the sheet,
   wherein the controller is further configured to: (i) receive position information indicating a position on the sheet where at least one representation among the representations is printed, which at least one representation is selected by the user on the sheet using the selection device, (ii) refer to information stored in the memory section to identify an adjustment corresponding to the at least one representation selected by the user, based on the received position information, and (iii) set the identified function and the corresponding adjustment on the image forming apparatus,
   wherein the composite image is printed on the sheet by the print section of the image forming apparatus and the printed sheet is output by the image forming apparatus, and
   wherein the selection made by the user using the selection device is made on the printed sheet having the composite image printed thereon by the print section of the image forming apparatus and having been output by the image forming apparatus.

2. The image forming apparatus of claim 1, wherein the display displays functions settable by the image forming apparatus on a list screen, and the user selects the one or more functions which are to be printed on the sheet along with the corresponding adjustments from among the functions displayed on the list screen via operation of the operation section.

3. The image forming apparatus of claim 1, wherein:
   the selection device comprises an electronic pen,
   the composite image generated by the controller and printed on the sheet by the print section further comprises a position detection code including a pattern that is identifiable by the electronic pen to obtain the position information of the position of the at least one representation selected by the user using the electronic pen on the sheet on which the composite image is printed, and
   the controller acquires the position information from the electronic pen.

4. The image forming apparatus of claim 1, wherein the display displays one screen out of a plurality of screens for setting a function, wherein each of the plurality of screens comprises an adjustment of at least one function.

5. A printing system comprising:
   a plurality of image forming apparatuses connected with each other via a network,
   wherein each of the image forming apparatuses comprises:
   a display which is configured to display at least one screen from among a plurality of screens for setting a function among a plurality of functions of the image forming apparatus, the screens comprising adjustments corresponding to the function;
   an operation section which is operable by a user to select one or more functions from among the plurality of functions displayed on the display, wherein the one or more functions selected by the user are to be printed on a sheet along with adjustments thereof, the selected one or more functions corresponding to the functions which are settable via the screens;
   a controller configured to aggregate and arrange the one or more functions which are selected by the user, along with the adjustments of each selected function, and to generate a composite image comprising representations of the selected functions and the corresponding adjustments selectable from the screens, and representations of the image forming apparatuses under management of the network;
   a print section to print the composite image including the representations of the one or more functions selected by the user via the operation section and the corresponding adjustments, and the image forming apparatuses, onto a sheet; and
   a memory section which stores the image forming apparatuses and the functions selected by the user via the operation section and the corresponding adjustments in association with position information of positions on the sheet at which the corresponding representations included in the composite image are printed, wherein one of the image forming apparatuses and the functions and corresponding adjustments are settable by the user via use of a selection device which is capable of sending position information to the controller corresponding to positions on the sheet at which the representations are printed, according to a selection made by the user using the selection device on the sheet, wherein the controller is further configured to: (i) receive position information indicating a position on the sheet where at least one representation among the representations is printed, which at least one representation is selected by the user on the sheet using the selection device, (ii) refer to information stored in the memory section to identify an image forming apparatus corresponding to a representation selected by the user, based on the received position information, and, (iii) when the image forming apparatus is the identified image forming apparatus, refer to the information stored in the memory section to identify an adjustment corresponding to a representation selected by the user, based on the received position information, and set the identified function and the corresponding adjustment on the identified image forming apparatus, wherein the composite image is printed on the sheet by the print section of one of the image forming apparatuses and the printed sheet is output by said one of the image forming apparatuses, and wherein the selection made by the user using the selection device is made on the printed sheet having the composite image printed thereon by the print section of said one of the image forming apparatuses and having been output by said one of the image forming apparatuses.

6. The image forming apparatus of claim 5, wherein the display displays functions settable by the image forming apparatus on a list screen, and the user selects the one or more functions which are to be printed on the sheet along with the corresponding adjustments from among the functions displayed on the list screen via operation of the operation section.

7. The image forming apparatus of claim 5, wherein:
the selection device comprises an electronic pen,
the composite image generated by the controller and printed on the sheet by the print section further comprises a position detection code including a pattern identifiable by the electronic pen to obtain the position information of the position of the at least one representation selected by the user using the electronic pen on the sheet on which the composite image is printed; and
the controller is further configured to acquire the position information from the electronic pen.

8. The printing system of claim 5, wherein the display displays one screen out of a plurality of screens for setting a function, wherein each of the plurality of screens comprises an adjustment of at least one function.

\* \* \* \* \*